(12) United States Patent
Tang et al.

(10) Patent No.: US 9,729,291 B2
(45) Date of Patent: Aug. 8, 2017

(54) METHOD AND DEVICE FOR TRANSMITTING REFERENCE SIGNAL

(71) Applicant: Huawei Technologies Co., Ltd., Shenzhen (CN)

(72) Inventors: Zhenfei Tang, Shenzhen (CN); Yuanjie Li, Shenzhen (CN)

(73) Assignee: Huawei Technologies Co., Ltd., Shenzhen, P.R. (CN)

( * ) Notice: Subject to any disclaimer, the term of this patent is extended or adjusted under 35 U.S.C. 154(b) by 113 days.

(21) Appl. No.: 14/626,094

(22) Filed: Feb. 19, 2015

(65) Prior Publication Data

US 2015/0172019 A1 Jun. 18, 2015

Related U.S. Application Data

(63) Continuation of application No. PCT/CN2012/080968, filed on Sep. 4, 2012.

(51) Int. Cl.
*H04L 5/00* (2006.01)
*H04B 7/06* (2006.01)
(Continued)

(52) U.S. Cl.
CPC .......... *H04L 5/0048* (2013.01); *H04B 7/06* (2013.01); *H04L 5/0023* (2013.01);
(Continued)

(58) Field of Classification Search
CPC .................................................. H04L 5/0048
See application file for complete search history.

(56) References Cited

U.S. PATENT DOCUMENTS

2010/0246712 A1 9/2010 Suo et al.
2011/0228735 A1 9/2011 Lee et al.
(Continued)

FOREIGN PATENT DOCUMENTS

CN 101431357 A 5/2009
CN 101621492 A 1/2010
(Continued)

OTHER PUBLICATIONS

"3$^{rd}$ Generation Partnership Project; Technical Specification Group Radio Access Network; Evolved Universal Terrestrial Radio Access (E-UTRA); Physical Channels and Modulation, (Release 10)," Global System for Mobile Communications, 3GPP TS 36.211, V10.3.0, Sep. 2011, 103 pages.
(Continued)

*Primary Examiner* — Jason Mattis
(74) *Attorney, Agent, or Firm* — Brinks, Gilson & Lione

(57) ABSTRACT

Embodiments of the present invention relate to the technical field of communications, and provide a method and device for transmitting a reference signal. The method for transmitting a reference signal comprises: a base station determining an antenna port of a reference signal corresponding to a broadcast channel; the base station determining a complex valued modulation symbol of the reference signal according to a first parameter of the reference signal, wherein the first parameter of the reference signal is determined by the number of resource blocks occupied by the broadcast channel; and the base station transmitting the determined complex valued modulation symbol of the reference signal to a user terminal on the determined antenna port of the reference signal. The present invention can be used in an LTE wireless communication system.

14 Claims, 6 Drawing Sheets step 10, determining an antenna port of a reference signal corresponding to a broadcast channel step 11, determining a complex-valued modulation symbol of the reference signal according to a first parameter of the reference signal, where the first parameter of the reference signal is determined according to the number of resource blocks occupied by the broadcast channel step 12, transmitting, at the determined antenna port of the reference signal, the determined complex-valued modulation symbol of the reference signal to a user equipment

(51) Int. Cl.
*H04L 27/26* (2006.01)
*H04W 72/00* (2009.01)

(52) U.S. Cl.
CPC ....... *H04L 27/2607* (2013.01); *H04W 72/005* (2013.01); *H04L 5/0016* (2013.01); *H04L 5/0053* (2013.01)

(56) References Cited

U.S. PATENT DOCUMENTS

| | | | |
|---|---|---|---|
| 2011/0261673 A1 | 10/2011 | Luo et al. | |
| 2011/0293037 A1* | 12/2011 | Liu | H04L 5/001 375/295 |
| 2012/0195390 A1* | 8/2012 | Liu | H04L 5/0007 375/260 |
| 2012/0201318 A1* | 8/2012 | Seo | H04L 27/2607 375/260 |
| 2012/0218950 A1 | 8/2012 | Yu et al. | |
| 2013/0039291 A1* | 2/2013 | Blankenship | H04L 5/001 370/329 |
| 2013/0235812 A1* | 9/2013 | Heo | H04L 5/001 370/329 |
| 2013/0265945 A1* | 10/2013 | He | H04L 27/2657 370/329 |
| 2013/0343318 A1* | 12/2013 | Gruet | H04L 5/001 370/329 |
| 2014/0036747 A1* | 2/2014 | Nory | H04W 72/0406 370/311 |

FOREIGN PATENT DOCUMENTS

| | | |
|---|---|---|
| CN | 101778068 A | 7/2010 |
| CN | 102077486 A | 5/2011 |
| CN | 102195923 A | 9/2011 |
| WO | WO 2011-055989 A2 | 5/2011 |

OTHER PUBLICATIONS

"3$^{rd}$ Generation Partnership Project; Technical Specification Group Radio Access Network; Evolved Universal Terrestrial Radio Access (E-UTRA); Physical Channels and Modulation, (Release 10)," Global System for Mobile Communications, 3GPP TS 36.211, V10.5.0, Jun. 2012, 101 pages.

"3$^{rd}$ Generation Partnership Project; Technical Specification Group Radio Access Network; Evolved Universal Terrestrial Radio Access (E-UTRA); Multiplexing and Channel Coding, (Release 10)," Global System for Mobile Communications, 3GPP TS 36.212, V10.3.0, Sep. 2011, 79 pages.

"3$^{rd}$ Generation Partnership Project; Technical Specification Group Radio Access Network; Evolved Universal Terrestrial Radio Access (E-UTRA); Multiplexing and Channel Coding, (Release 10)," Global System for Mobile Communications, 3GPP TS 36.212, V10.6.0, Jun. 2012, 79 pages.

"3$^{rd}$ Generation Partnership Project; Technical Specification Group Radio Access Network; Evolved Universal Terrestrial Radio Access (E-UTRA); Physical Layer Procedures, (Release 10)," Global System for Mobile Communications, 3GPP TS 36.213, V10.3.0, Sep. 2011, 122 pages.

"3$^{rd}$ Generation Partnership Project; Technical Specification Group Radio Access Network; Evolved Universal Terrestrial Radio Access (E-UTRA); Physical Layer Procedures, (Release 10)," Global System for Mobile Communications, 3GPP TS 36.213, V10.6.0, Jun. 2012, 125 pages.

* cited by examiner step 301, determining an antenna port of a reference signal corresponding to a broadcast channel, where the antenna port of the reference signal includes antenna ports {a, b, c, d} step 302, determining a complex-valued modulation symbol of the reference signal of the broadcast channel step 303, transmitting, at the determined antenna port of the reference signal, the determined complex-valued modulation symbol of the reference signal

Figure 8 step 401, determining an antenna port of a reference signal corresponding to a broadcast channel, where the antenna port of the reference signal includes antenna ports {a, b, c, d} step 402, receiving, at the determined antenna port of the reference signal, a complex-valued modulation symbol of the reference signal, so as to demodulate the broadcast channel

Figure 9

METHOD AND DEVICE FOR TRANSMITTING REFERENCE SIGNAL

CROSS REFERENCES OF RELATED APPLICATION

This application is a continuation of International Application No. PCT/CN2012/080968, filed on Sep. 4, 2012, which is incorporated herein by reference in its entirety.

TECHNICAL FIELD

The present application relates to the field of communication technology, and particularly to a method and a device for transmission of a reference signal.

BACKGROUND

A physical broadcast channel (PBCH) is defined in Long Term Evolution (LTE) Release-8/Release-9/Release-10/Release-11. A cell-specific reference signal is adopted for demodulation for PBCH. When accessing a cell, a user equipment UE obtains basic information necessary for accessing the cell by detecting PBCH. The basic information carried by PBCH includes a downlink system bandwidth, the number of transmitting antennas, a system frame number, etc.

Carriers of new carrier types (NCT) are defined in LTE Release-11. In a carrier of the new carrier type, density of the cell-specific reference signals is decreased to reduce interference of the cell-specific reference signals to other cells. Cell-specific reference signals are transmitted only in some normal downlink subframes. Therefore, there may be no cell-specific reference signal in a subframe transmitting PBCH, and the PBCH channel can not be demodulated by the cell-specific reference signal. Therefore, the PBCH can not be transmitted in the carrier of the new carrier type, and the PBCH needs to be sent by another carrier. Thus, if a UE wants to access a carrier of the new carrier type, the UE can only access the carrier of the new carrier type through a PBCH of the carrier of the new carrier type which is sent by another carrier.

SUMMARY

Embodiments of the application are mainly to provide a method and a device for transmission of a reference signal, with which a broadcast channel can be transmitted by a carrier of a new carrier type, and a UE can directly receive the broadcast channel from the carrier of the new carrier type and thus access the carrier of the new carrier type.

To achieve the above purpose, solutions as follows are provided by the embodiments of the application.

A method for transmission of a reference signal is provided by an embodiment of the application. The transmission method includes:

determining, by a base station, an antenna port of a reference signal corresponding to a broadcast channel;

determining, by the base station, a complex-valued modulation symbol of the reference signal according to a first parameter of the reference signal, where the first parameter of the reference signal is determined according to the number of resource blocks occupied by the broadcast channel; and transmitting, by the base station and at the determined antenna port of the reference signal, the determined complex-valued modulation symbol of the reference signal to a user equipment.

A method for transmission of a reference signal is provided by another embodiment of the application. The method includes:

determining, by a user equipment, an antenna port of a reference signal corresponding to a broadcast channel; and receiving, by the user equipment, a complex-valued modulation symbol of the reference signal transmitted by a base station at the determined antenna port of the reference signal;

the method further includes:

determining, by the user equipment, the complex-valued modulation symbol of the reference signal according to a first parameter of the reference signal, where the first parameter of the reference signal is determined according to the number of resource blocks occupied by the broadcast channel.

A base station is provided by another embodiment of the application. The base station includes:

a port determination unit, configured to determine an antenna port of a reference signal corresponding to a broadcast channel;

a symbol determination unit, configured to determine a complex-valued modulation symbol of the reference signal according to a first parameter of the reference signal, where the first parameter of the reference signal is determined according to the number of resource blocks occupied by the broadcast channel; and a transmitting unit, configured to transmit, at the antenna port of the reference signal determined by the port determination unit, the complex-valued modulation symbol of the reference signal determined by the symbol determination unit to a user equipment.

A user equipment is provided by another embodiment of the application. The user equipment includes:

a port determination unit, configured to determine an antenna port of a reference signal corresponding to a broadcast channel; and a receiving unit, configured to receive a complex-valued modulation symbol of the reference signal transmitted by a base station at the antenna port of the reference signal determined by the port determination unit;

the user equipment further includes:

a symbol determination unit, configured to determine a complex-valued modulation signal of the reference signal according to a first parameter of the reference signal, where the first parameter of the reference signal is determined according to the number of resource blocks occupied by the broadcast channel.

According to the methods for transmission of a reference signal, the base station and the UE provided by the embodiments of the application, the base station transmits to the UE a reference signal used to demodulate a broadcast channel and determines a complex-valued modulation symbol of the reference signal transmitted to the UE according to a first parameter of the reference signal; the UE can directly determine the complex-valued modulation symbol of the reference signal transmitted by the base station according to the parameter and then performs channel estimation to demodulate the broadcast channel. In this way, a carrier of a new carrier type can transmit a broadcast channel, and the UE can directly receive the broadcast channel from the carrier of the new carrier type and then access the carrier of the new carrier type.

A method for transmission of a reference signal is further provided by another embodiment of the application. The transmission method includes steps as follows:

determining an antenna port of a reference signal corresponding to a broadcast channel, where the antenna port of the reference signal includes antenna ports {a, b, c, d}, where locations of resource elements corresponding to the antenna port c and the antenna port d are only mapped to resource elements on OFDM symbol 1 in slot 1, or locations of resource elements corresponding to the antenna port c and the antenna port d are only mapped to resource elements on OFDM symbol 1 in slot 0, or locations of resource elements corresponding to the antenna port c and the antenna port d are only mapped to a resource element on OFDM symbol 3 in slot 0 and to a resource element on OFDM symbol 1 in slot 1, or locations of resource elements corresponding to the antenna port c and the antenna port d are only mapped to a resource element on OFDM symbol 2 in slot 0 and to a resource element on OFDM symbol 1 in slot 1, or locations of resource elements corresponding to the antenna port c and the antenna port d are only mapped to a resource element on OFDM symbol 3 in slot 0 and to a resource element on OFDM symbol 1 in slot 0, or locations of resource elements corresponding to the antenna port c and the antenna port d are only mapped to a resource element on OFDM symbol 2 in slot 0 and to a resource element on OFDM symbol 1 in slot 0;

determining a complex-valued modulation symbol of the reference signal of the broadcast channel; and transmitting, at the determined antenna port of the reference signal, the determined complex-valued modulation symbol of the reference signal.

A method for transmission of a reference signal is further provided by another embodiment of the application. The transmission method includes steps as follows:

determining an antenna port of a reference signal corresponding to a broadcast channel, where the antenna port of the reference signal includes antenna ports {a, b, c, d}, where a, b, c and d are any positive integers, where locations of resource elements corresponding to the antenna port c and the antenna port d are only mapped to resource elements on OFDM symbol 1 in slot 1, or locations of resource elements corresponding to the antenna port c and the antenna port d are only mapped to resource elements on OFDM symbol 1 in slot 0, or locations of resource elements corresponding to the antenna port c and the antenna port d are only mapped to a resource element on OFDM symbol 3 in slot 0 and to a resource element on OFDM symbol 1 in slot 1, or locations of resource elements corresponding to the antenna port c and the antenna port d are only mapped to a resource element on OFDM symbol 2 in slot 0 and to a resource element on OFDM symbol 1 in slot 1, or locations of resource elements corresponding to the antenna port c and the antenna port d are only mapped to a resource element on OFDM symbol 3 in slot 0 and to a resource element on OFDM symbol 1 in slot 0, or locations of resource elements corresponding to the antenna port c and the antenna port d are only mapped to a resource element on OFDM symbol 2 in slot 0 and to a resource element on OFDM symbol 1 in slot 0; and receiving, at the determined antenna port of the reference signal, a complex-valued modulation symbol of the reference signal.

A base station is further provided by another embodiment of the application. The base station includes:

a port determination unit, configured to determine an antenna port of a reference signal corresponding to a broadcast channel, where the antenna port of the reference signal includes antenna ports {a, b, c, d}, where a, b, c and d are any positive integers, where locations of resource elements corresponding to the antenna port c and the antenna port d are only mapped to resource elements on OFDM symbol 1 in slot 1, or locations of resource elements corresponding to the antenna port c and the antenna port d are only mapped to resource elements on OFDM symbol 1 in slot 0, or locations of resource elements corresponding to the antenna port c and the antenna port d are only mapped to a resource element on OFDM symbol 3 in slot 0 and to a resource element on OFDM symbol 1 in slot 1, or locations of resource elements corresponding to the antenna port c and the antenna port d are only mapped to a resource element on OFDM symbol 2 in slot 0 and to a resource element on OFDM symbol 1 in slot 1, or locations of resource elements corresponding to the antenna port c and the antenna port d are only mapped to a resource element on OFDM symbol 3 in slot 0 and to a resource element on OFDM symbol 1 in slot 0, or locations of resource elements corresponding to the antenna port c and the antenna port d are only mapped to a resource element on OFDM symbol 2 in slot 0 and to a resource element on OFDM symbol 1 in slot 0;

a symbol determination unit, configured to determine a complex-valued modulation symbol of the reference signal of the broadcast channel; and a transmitting unit, configured to transmit, at the antenna port of the reference signal determined by the port determination unit, the complex-valued modulation symbol of the reference signal determined by the symbol determination unit.

A user equipment is further provided by another embodiment of the application. The user equipment includes:

a port determination unit, configured to determine an antenna port of a reference signal corresponding to a broadcast channel, where the antenna port of the reference signal includes antenna ports {a, b, c, d}, where a, b, c and d are any positive integers, where locations of resource elements corresponding to the antenna port c and the antenna port d are only mapped to resource elements on OFDM symbol 1 in slot 1, or locations of resource elements corresponding to the antenna port c and the antenna port d are only mapped to resource elements on OFDM symbol 1 in slot 0, or locations of resource elements corresponding to the antenna port c and the antenna port d are only mapped to a resource element on OFDM symbol 3 in slot 0 and to a resource element on OFDM symbol 1 in slot 1, or locations of resource elements corresponding to the antenna port c and the antenna port d are only mapped to a resource element on OFDM symbol 2 in slot 0 and to a resource element on OFDM symbol 1 in slot 1, or locations of resource elements corresponding to the antenna port c and the antenna port d are only mapped to a resource element on OFDM symbol 3 in slot 0 and to a resource element on OFDM symbol 1 in slot 0, or locations of resource elements corresponding to the antenna port c and the antenna port d are only mapped to a resource element on OFDM symbol 2 in slot 0 and to a resource element on OFDM symbol 1 in slot 0; and a receiving unit, configured to receive, at the antenna port of the reference signal determined by the port determination unit, a complex-valued modulation symbol of the reference signal.

According to the methods for transmission of the reference signal, the base station and the UE provided by the embodiments of the application, the base station transmits to the UE, at a specific antenna port, a reference signal used to demodulate a broadcast channel, and thus a carrier of a new carrier type can transmit a broadcast channel, and a UE can directly receive the broadcast channel from the carrier of the new carrier type and then access the carrier of the new carrier type.

BRIEF DESCRIPTION OF DRAWINGS

For clarity of description of technical solutions in embodiments of the application or technical solutions in prior art, drawings for description of the embodiments or of prior art are introduced below briefly. Apparently, the drawings described below are merely a few embodiments of the application. For those skilled in the art, other drawings may be obtained without paying any creative work according to these drawings.

FIG. 8 is a flow chart of a method for transmission of a reference signal according to an embodiment of the application;

FIG. 9 is a flow chart of a method for transmission of a reference signal according to an embodiment of the application;

DETAILED DESCRIPTION OF EMBODIMENTS

Figure 1:
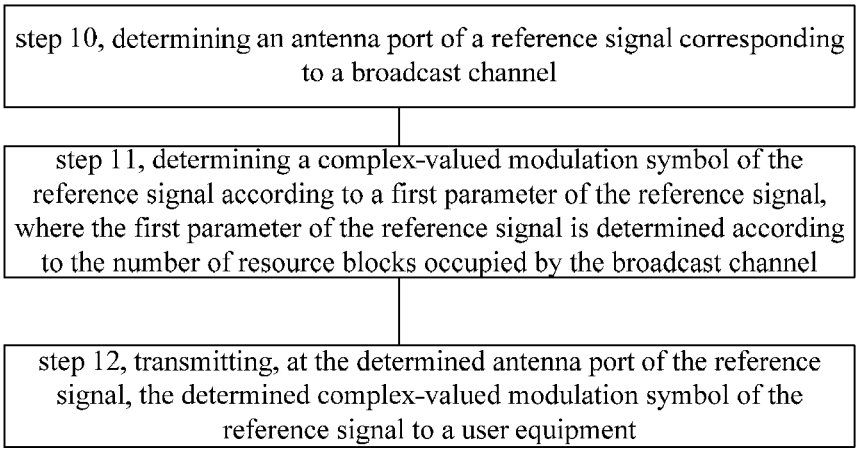
FIG. 1 is a flow chart of a method for transmission of a reference signal according to an embodiment of the application.
Figure 2:
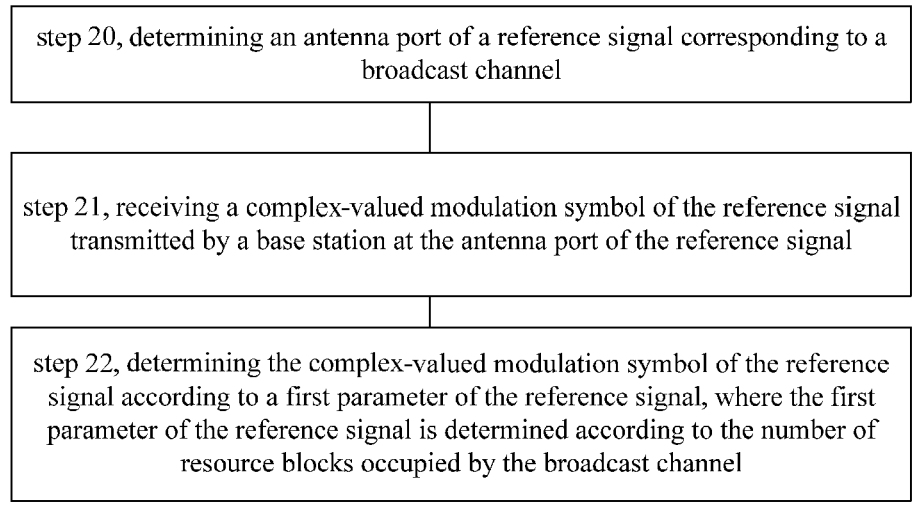
FIG. 2 is a flow chart of a method for transmission of a reference signal according to an embodiment of the application.

Technical solutions in embodiments of the application are clearly described below in combination with drawings in embodiments of the application. Apparently, the described embodiments are merely a few but not all of embodiments of the application. Based on the embodiments of the application, all other embodiments obtained by those skilled in the art without creative work are within the scope of the application.

It is to be noted that the broadcast channel in the embodiments of the application includes but is not limited to a physical broadcast channel, an enhanced physical broadcast channel, or broadcast information transmitted through other channels. The resource block in the embodiments of the application includes but is not limited to a physical resource block or a logical resource block. The resource block includes a resource block in a slot or a resource block in a subframe, where resource block in a subframe is also referred to as a resource block pair, and the above are collectively referred to as a resource block in the embodiments of the application for convenience of description. The cell identity in the embodiments of the application includes but is not limited to a physical layer cell identity, an enhanced physical cell identity, a logical cell identity, or a virtual cell identity.

For better understanding the technical solutions of the application by those skilled in the art, the reference signal of the LTE system is briefly described.

In the LTE system, reference signals include cell-specific reference signals and user-specific reference signals. In LTE Release-8/LTE Release-9/LTE Release-10, cell-specific reference signals are distributed in all normal downlink subframes of a carrier of LTE Release-8/LTE Release-9/LTE Release-10, and are transmitted in the whole system bandwidth. The user-specific reference signal is transmitted only during information transmission of a user equipment corresponding to the reference signal. In a carrier of a new carrier type of LTE Release-11, cell-specific reference signals are transmitted only in some normal downlink subframes. For a PBCH channel, a UE uses a cell-specific reference signal for demodulation. For a Physical Downlink Shared Channel (PDSCH) and for an Enhanced Physical Downlink Control Channel (EPDCCH) of a UE, a user-specific reference signal may be used for demodulation. The cell-specific reference signal and the user-specific reference signal include: a corresponding antenna port and information transmitted at the corresponding antenna port. The information transmitted at the antenna port is a complex-valued modulation symbol $a_{k,l}^{(p)}$ obtained by weighting a part of reference signal sequence and mapping the weighted reference signal sequence to the corresponding antenna port and to the corresponding resource element. p is the antenna port, k is a subcarrier index, and l is an Orthogonal Frequency Division Multiplexing (OFDM) symbol index. There are 3 cases for a cell-specific reference signal: an antenna port {0} with 1 antenna, antenna ports {0,1} with 2 transmitting antennas, and antenna ports {0,1,3,4} with 4 transmitting antennas, namely antenna ports of a cell-specific reference signal. As to a user-specific reference signal, antenna ports 7-14 are supported in a case of a normal cyclic prefix (CP), and antenna ports 7 and 8 are supported in a case of an extended CP.

It is to be noted that, the cell-specific reference signal and the user-specific reference signal in the description below are respectively a cell-specific reference signal and a user-specific reference signal in LTE Release-8/LTE Release-9/LTE Release-10, except when otherwise specified.

Based on the above, embodiments of the application are described below in detail.

As shown in FIG. 1, a method for transmission of a reference signal is provided by an embodiment of the application. The reference signal is configured to demodulate a broadcast channel. The transmission method is performed by a base station, and the transmission method includes steps 10-12.

Step 10 includes: determining an antenna port of a reference signal corresponding to a broadcast channel.

The antenna port of the reference signal corresponding to the broadcast channel may be preset. Therefore, in this step, the base station may determine the antenna port of the reference signal corresponding to the broadcast channel according to the presetting. The antenna port of the reference signal corresponding to the broadcast channel may also be selected by the base station in a real time manner from a set of preset ports of the reference signal corresponding to the broadcast channel according to practical conditions such as a channel state. The determination of the antenna port is not limited in the application.

In an embodiment of the application, the antenna port of the reference signal corresponding to the broadcast channel is preset. For example, it is preset that the broadcast channel always uses two antenna ports a and b, then it can be determined according to the presetting that the antenna port of the reference signal corresponding to the broadcast is antenna ports a and b in this step. Resource consumption of the reference signal can be reduced by always using the two antenna ports a and b by the broadcast channel.

It can be understood that, a, b and port numbers c and d used below are used to indicate port numbers of antenna ports of a reference signal corresponding to a broadcast channel for convenience of description, but not to limit the antenna ports of the reference signal corresponding to the broadcast channel, and can be substituted with other port numbers.

Optionally, in terms of time, the two antenna ports a and b may be distributed on subframes with broadcast channels. In terms of frequency, the two antenna ports may be distributed on subcarriers or resource blocks with broadcast channels. The resource blocks include but are not limited to 1-6 resource blocks.

Optionally, the two antenna ports a and b may be antenna ports located where resource elements of any two antenna ports among antenna ports 7-14 are located, or may be an enhanced form of any two of the antenna ports 7-14, i.e., antenna ports shifting by at least one OFDM symbol or at least one carrier from locations of any two of the antenna ports 7-14. For example, if a system bandwidth $N_{RB}^{DL}$ is an even number, time-frequency locations of the antenna ports a and b are consistent with the time-frequency locations of antenna ports 11, 12 or the time-frequency locations of antenna ports 11, 13. If the system bandwidth $N_{RB}^{DL}$ is an odd number, time-frequency locations of the antenna ports a and b shift by at least one subcarrier in frequency domain from the time-frequency locations of antenna ports 11, 12 or the time-frequency locations of antenna ports 11, 13.

The any two antenna ports among the antenna ports 7-14 or the enhanced form of any two antenna ports among the antenna ports 7-14 are antenna ports of the user-specific reference signal. Therefore, antenna ports of the user-specific reference signal are used to transmit a reference signal for demodulating a broadcast channel, and a UE uses the user-specific reference signal to demodulate the broadcast channel. Therefore, even no cell-specific reference signal is in a subframe transmitting a broadcast channel, a carrier of a new carrier type can transmit the broadcast channel, and the UE can directly receive the broadcast channel from the carrier of the new carrier type and then access the carrier of the new carrier type.

Alternatively, in another embodiment of the application, it is preset that the broadcast channel always uses four antenna ports a, b, c and d. In this step, it can be determined according to the presetting that the antenna ports of the reference signal corresponding to the broadcast channel are antenna ports a, b, c and d. Performance of demodulation for the broadcast channel can be improved by always using four antenna ports a, b, c and d by the broadcast channel.

Optionally, in terms of time, the four antenna ports a, b, c and d may be distributed on subframes with broadcast channels. In terms of frequency, the four antenna ports may be distributed on subcarriers or resource blocks with broadcast channels. The resource blocks may include but are not limited to 1-6 resource blocks.

Optionally, the four antenna ports a, b, c and d may be antenna ports located where resource elements of any four antenna ports among antenna ports 7-14 are located, or may be an enhanced form of any four of the antenna ports 7-14, i.e., antenna ports shifting by at least one OFDM symbol or at least one carrier from locations of resource elements of any four of the antenna ports 7-14. For example, if a system bandwidth $N_{RB}^{DL}$ is an even number, time-frequency locations of the antenna ports a, b, c and d are consistent with time-frequency locations of antenna ports 11, 12, 13, 14. If the system bandwidth $N_{RB}^{DL}$ is an odd number, time-frequency locations of the antenna ports a, b, c and d shift by at least one subcarrier in frequency domain from the time-frequency locations of antenna ports 11, 12 or 11, 13.

Similarly, the any four antenna ports among the antenna ports 7-14 or the enhanced form of the any four antenna ports among the antenna ports 7-14 are antenna ports of the user-specific reference signal. Therefore, antenna ports of the user-specific reference signal are used to transmit a reference signal for demodulating a broadcast channel, and a UE uses the user-specific reference signal to demodulate the broadcast channel. Therefore, even no cell-specific reference signal is in a subframe transmitting a broadcast channel, a carrier of a new carrier type can transmit the broadcast channel, and the UE can directly receive the broadcast channel from the carrier of the new carrier type and then access the carrier of the new carrier type.

In the above two examples, the antenna ports corresponding to the broadcast channel are preset. Therefore, the antenna ports corresponding to the broadcast channel are also preset for a UE. The UE can determine the antenna ports corresponding to the broadcast channel according to the presetting, and then receive the reference signal at the determined antenna ports.

Alternatively, in another embodiment of the application, a broadcast channel may use two antenna ports, or may use four antenna ports. Which antenna ports are the two antenna ports and the four antenna ports are preset. In this step, the base station may determine in a real time manner which two antenna ports or which four antenna ports are the antenna ports of the reference signal corresponding to the broadcast channel according to practical conditions such as a channel state or a UE performance. The UE may determine the antenna ports by a blind detection. In this way, the base station may select the antenna ports in a real time manner, therefore, an effect of balancing overhead of the reference signal and the performance of demodulation for the broadcast channel can be achieved.

Step 11 includes: determining a complex-valued modulation symbol of the reference signal according to a first parameter of the reference signal, where the first parameter of the reference signal is determined according to the number of resource blocks occupied by the broadcast channel.

Before receiving information in the broadcast channel, the UE obtains very little information about its cell. For example, the UE can not obtain a downlink system bandwidth of the cell. Therefore, the UE may not determine the complex-valued modulation symbol of the reference signal, and thus can not perform channel estimation and can not demodulate the broadcast channel. In view of the above, the first parameter of the reference signal is introduced in the embodiment of the application. It is to be noted that, the parameter is preset, and the UE can directly determine the complex-valued modulation symbol of the reference signal transmitted by the base station according to the parameter and then perform channel estimation to demodulate the broadcast channel.

Optionally, the first parameter may be predefined as a fixed value, or may be defined as a function of some parameter known to the UE, such as a cell identity.

Step 12 includes: transmitting, at the determined antenna port of the reference signal, the determined complex-valued modulation symbol of the reference signal to a user equipment.

According to the method for transmission of a reference signal provided by the embodiment of the application, the base station transmits to the UE a reference signal used to demodulate a broadcast channel, and determines, according to a predefined first parameter of the reference signal, a complex-valued modulation symbol of the reference signal transmitted to the UE. Because the first parameter of the reference signal is predefined, the UE can directly determine, according to the parameter, the complex-valued modulation symbol of the reference signal transmitted by the base station, and then perform channel estimation to demodulate the broadcast channel. Therefore, a carrier of a new carrier type can transmit a broadcast channel, and a UE can directly receive the broadcast channel from the carrier of the new carrier type and then access the carrier of the new carrier type.

Furthermore, before receiving information in the broadcast channel, the UE obtains very little information about its cell. The UE can not obtain a downlink system bandwidth of the cell. Therefore, the UE may not know a subcarrier to which the reference signal is mapped. Therefore, according to an embodiment of the application, the transmission method of the embodiment shown in FIG. 1 may further include a step as follows:

determining a subcarrier of the complex-valued modulation symbol of the reference signal according to the first parameter of the reference signal. In this case, in step 12, the base station transmits, at the determined antenna port of the reference signal and on the determined subcarrier, the determined complex-valued modulation symbol of the reference signal to the user equipment.

Because the first parameter is preset, the UE can determine, according to the first parameter, the subcarrier of the complex-valued modulation symbol of the reference signal, and then receive the reference signal to demodulate the broadcast channel.

In correspondence with the transmission method shown in FIG. 1, a method for transmission of a reference signal is further provided by another embodiment of the application. The reference signal is configured to demodulate a broadcast channel. The method is performed by a UE, and the method includes step 20-22.

Step 20 includes: determining an antenna port of a reference signal corresponding to a broadcast channel.

The UE may determine the antenna port of the reference signal corresponding to the broadcast channel according to presetting, or may determine the antenna port of the reference signal corresponding to the broadcast channel by a blind detection.

Optionally, the antenna port of the reference signal corresponding to the broadcast channel may include antenna ports located where resource elements of any two or four antenna ports among antenna ports 7-14 are located, or antenna ports shifting by at least one OFDM symbol or by at least one carrier from locations of resource elements of any two or four antenna ports among antenna ports 7-14.

The antenna ports of the reference signal corresponding to the broadcast channel may refer to the foregoing description of the embodiment shown in FIG. 1, which is omitted herein.

Step 21 includes: receiving a complex-valued modulation symbol of the reference signal transmitted by a base station at the antenna port of the reference signal.

The transmission method of the embodiment further includes step 22.

Step 22 includes: determining a complex-valued modulation symbol of the reference signal according to a first parameter of the reference signal, where the first parameter of the reference signal is determined according to the number of resource blocks occupied by the broadcast channel.

It is to be noted that the performing sequence of step 21 and step 22 is not limited. The step 21 and step 22 may be performed in sequence. For example, step 21 is performed first, or step 22 is performed first. Alternatively, step 21 and step 22 may be performed concurrently.

In transmitting the reference signal by the base station to the UE, the reference signal arrived at the UE after channel transmission is changed, such as attenuated, compared with the reference signal originally transmitted by the base station, due to affects of channel quality. Therefore, in the embodiment, the complex-valued modulation symbol of the reference signal transmitted by the base station and received by the UE in step 21 is called as a received complex-valued modulation signal, and the complex-valued modulation symbol of the reference signal determined by the UE in step 22 is called as a local complex-valued modulation symbol. The UE can perform channel estimation based on the local complex-valued modulation symbol and the received complex-valued modulation symbol, to demodulate the broadcast channel.

In the embodiment, in a similar way as the base station, the UE uses the predefined first parameter of the reference signal to determine the local complex-valued modulation signal of the reference signal. In this way, the UE can accurately determine the local complex-valued modulation signal under a condition of knowing rare information about the cell, and then perform channel estimation to demodulate the broadcast channel.

According to the method for transmission of the reference signal provided in the embodiment of the application, the UE determines the local complex-valued modulation symbol of the reference signal transmitted to the UE according to the predefined first parameter of the reference signal. Because the first parameter of the reference signal is predefined, the UE can directly determine, according to the parameter, the local complex-valued modulation symbol of the reference signal transmitted by the base station, and then perform channel estimation to demodulate the broadcast channel. Therefore, a carrier of a new carrier type can transmit a broadcast channel, and the UE can directly receive the broadcast channel from the carrier of the new carrier type and then access the carrier of the new carrier type.

Furthermore, in an embodiment of the application, the method further includes:

determining a subcarrier of the complex-valued modulation symbol of the reference signal of the broadcast channel according to the first parameter of the reference signal.

In this case, in step 21, the UE the complex-valued modulation symbol of the reference signal transmitted at the determined antenna port of the reference signal and on the determined subcarrier.

Figure 3:
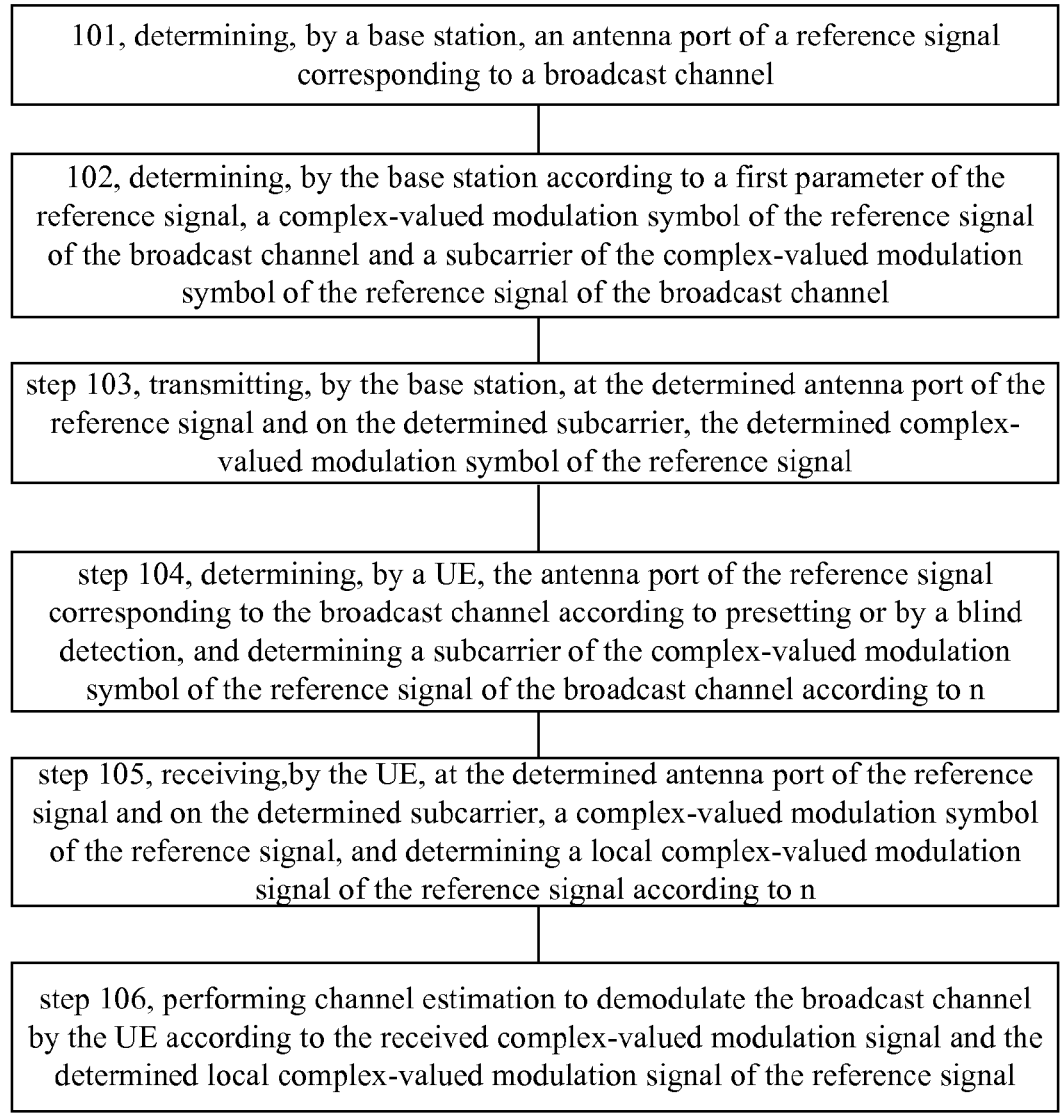
FIG. 3 is a flow chart of a method for transmission of a reference signal according to an embodiment of the application.

The method for transmission of the reference signal provided in the embodiment of the application is further described in detail below by a specific embodiment. In the embodiment below, the antenna port of the reference signal corresponding to the broadcast channel is p ∈ {a, b, c, d}. In this embodiment, a, b, c and d indicate antenna ports located where resource elements of any four antenna ports among antenna ports 7-14 are located, or antenna ports shifting by at least one OFDM symbol or by at least one carrier from locations of resource elements of any four antenna ports among antenna ports 7-14. However, it can be understood that the application is not limited to these conditions. In the application, a, b, c and d may also be other antenna ports. As shown in FIG. 3, the specific embodiment includes steps 101-106.

Step 101 includes: determining, by a base station, an antenna port of a reference signal corresponding to a broadcast channel.

The antenna port determined in this step may be two antenna ports, or may be four antenna ports.

Step 102 includes: determining, by the base station according to a first parameter of the reference signal, a complex-valued modulation symbol of the reference signal of the broadcast channel and a subcarrier of the complex-valued modulation symbol of the reference signal of the broadcast channel.

For example, in this step, in a case of a normal CP:

the subcarrier of the complex-valued modulation symbol of the reference signal may be determined by the base station according to formula (1) as follows, the first formula (1) is:

$$k = 5m' + N_{sc}^{RB} n + k' + \frac{N_{RB}^{DL} N_{sc}^{RB}}{2} - 36$$

where $$m' = 0, 1, 2$$

$$k' = \begin{cases} 1 & p \in \{a, b\} \\ 0 & p \in \{c, d\} \end{cases},$$

where k is a subcarrier index, n is the first parameter of the reference signal, $N_{sc}^{RB}$ is the number of subcarriers of a resource block, and $N_{RB}^{DL}$ is a system bandwidth.

The complex-valued modulation symbol $a_{k,l}^{(p)}$, where p is the antenna port, k is a subcarrier index, and l is an OFDM symbol index, of the reference signal of the broadcast channel may be determined by the base station according to formula (3) as follows, the formula (3) is:

$$a_{k,l}^{(p)} = w_p(l') \cdot r(3 \cdot l' \cdot N_{RB}^{max,DL} + 3n + m')$$

where $$w_p(i) = \begin{cases} \overline{w}_p(i) & (m' + n)\bmod 2 = 0 \\ \overline{w}_p(3 - i) & (m' + n)\bmod 2 = 1 \end{cases}$$

$$l = l'\bmod 2 + 5$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, 2,$$

a value of $\overline{w}_p(i)$ is:

$$[\overline{w}_p(0)\ \overline{w}_p(1)\ \overline{w}_p(2)\ \overline{w}_p(3)] = \begin{cases} [+1\ +1\ -1\ -1], & p \in a \\ [-1\ -1\ +1\ +1], & p \in b \\ [+1\ -1\ -1\ +1], & p \in c \\ [-1\ +1\ +1\ -1], & p \in d \end{cases},$$

where n is the first parameter of the reference signal, $N_{RB}^{max,DL}$ is a maximum system bandwidth, which is usually 110, $n_s$ is a slot number, and mod indicates a modulo operation;

r(x) is a reference signal sequence, for example, r(x) may be calculated as follows:

$$r(x) = \frac{1}{\sqrt{2}}(1 - 2 \cdot c(2x)) + j\frac{1}{\sqrt{2}}(1 - 2 \cdot c(2x + 1)),$$

where c(y) is a Gold sequence, and the initial value $c_{init}$ may be as follows.

$c_{init} = (\lfloor n_s/2 \rfloor + 1) \cdot (2X+1) \cdot 2^{16} + n_{SCID} + n_{CP}$, where X equals to a cell identity; $n_{SCID}$ equals to 0; $n_{CP}$ is 1 in a case of a normal CP and is 0 in a case of an extended CP, or conversely; and $n_s$ is a slot number.

Or, $c_{init} = (\lfloor n_s/2 \rfloor + 1) \cdot (2X+1) \cdot 2^{16} + n_{CP}$, where X equals to a cell identity; $n_{CP}$ is 1 in a case of a normal CP and is 0 in a case of an extended CP, or conversely; and $n_s$ is a slot number.

Or, $c_{init} = (\lfloor n_s/2 \rfloor + 1) \cdot (2X+1) \cdot 2^{16} + n_{SCID}$, where X equals to a cell identity; $n_{SCID}$ is 1 in a case of a normal CP and is 0 in a case of an extended CP, or conversely; and $n_s$ is a slot number.

It is to be noted that, in determining the subcarrier and the complex-valued modulation symbol, values of the first parameter n are the same. Optionally, n is predefined as one of values as follows.

The first value is:

n=0,1, . . . , $N_{BCH}$−1, where $N_{BCH}$ is the number of resource blocks occupied by the broadcast channel.

The second value is:

n=n', n'+1, . . . , n'+$N_{BCH}$−1, where n' is a predefined integer, and $N_{BCH}$ is the number of resource blocks occupied by the broadcast channel.

The third value is:

n=n', n'+1, . . . , n'+$N_{BCH}$−1, where n'=cell_id mod ($N_{RB}^{max,DL}$+1−$N_{BCH}$), or n'=cell_id mod($N_{RB}^{max,DL}$−$N_{BCH}$), or n'=cell_id modM, $N_{RB}^{max,DL}$ is a maximum system bandwidth, M is an integer no larger than the maximum system bandwidth $N_{RB}^{max,DL}$, cell-id is a cell identity, mod indicates a modulo operation, and $N_{BCH}$ is the number of resource blocks occupied by the broadcast channel.

For example, in this step, in a case of an extended CP:

the subcarrier of the complex-valued modulation symbol of the reference signal may be determined by the base station according to formula (2) as follows, the formula (2) is:

$$k = 3m' + N_{sc}^{RB} n + k' + \frac{N_{RB}^{DL} N_{sc}^{RB}}{2} - 36$$

where $$m' = 0, 1, 2, 3$$

-continued $$k' = \begin{cases} 1 & \text{if } n_s \bmod 2 = 0 \text{ and } p \in \{a, b\} \\ 2 & \text{if } n_s \bmod 2 = 1 \text{ and } p \in \{a, b\} \end{cases},$$

where k is a subcarrier index, n is the first parameter of the reference signal, $N_{sc}^{RB}$ is the number of subcarriers of a resource block, $N_{RB}^{DL}$ is a system bandwidth, and mod indicates a modulo operation.

The complex-valued modulation symbol $a_{k,l}^{(p)}$, where p is the antenna port, k is a subcarrier index, and l is an OFDM symbol index, of the reference signal of the broadcast channel may be determined by the base station according to formula (4) as follows, the formula (4) is:

$$a_{k,l}^{(p)} = w_p(l' \bmod 2) \cdot r(4 \cdot l' \cdot N_{RB}^{max,DL} + 4 \cdot n + m'),$$

where $$w_p(i) = \begin{cases} \overline{w}_p(i) & m' \bmod 2 = 0 \\ \overline{w}_p(1-i) & m' \bmod 2 = 1 \end{cases}$$

$$l = l' \bmod 2 + 4$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, 2, 3$$

a value of $\overline{w}_p(i)$ is:

$$[\overline{w}_p(0) \ \overline{w}_p(1)] = \begin{cases} [+1 \ +1], & p \in a \\ [-1 \ +1], & p \in b \end{cases},$$

where n is the first parameter of the reference signal, $N_{RB}^{max,DL}$ is a maximum system bandwidth, $n_s$ is a slot number, and mod indicates a modulo operation;

r(x) is a reference signal sequence, for example, r(x) may be calculated as follows:

$$r(x) = \frac{1}{\sqrt{2}}(1 - 2 \cdot c(2x)) + j\frac{1}{\sqrt{2}}(1 - 2 \cdot c(2x+1)),$$

where c(y) is a Gold sequence, and the initial value $c_{init}$ may be as follows.

$c_{init} = (\lfloor n_s/2 \rfloor + 1) \cdot (2X+1) \cdot 2^{16} + n_{SCID} + n_{CP}$, where X equals to a cell identity; $n_{SCID}$ equals to 0; $n_{CP}$ is 1 in a case of a normal CP and is 0 in a case of an extended CP, or conversely; and $n_s$ is a slot number.

Or, $c_{init} = (\lfloor n_s/2 \rfloor + 1) \cdot (2X+1) \cdot 2^{16} + n_{CP}$, where X equals to a cell identity; $n_{CP}$ is 1 in a case of a normal CP and is 0 in a case of an extended CP, or conversely; and $n_s$ is a slot number.

Or, $c_{init} = (\lfloor n_s/2 \rfloor + 1) \cdot (2X+1) \cdot 2^{16} + n_{SCID}$, where X equals to a cell identity; $n_{SCID}$ is 1 in a case of a normal CP and is 0 in a case of an extended CP, or conversely; and $n_s$ is a slot number.

It is to be noted that in determining the subcarrier and the complex-valued modulation symbol, values of the first parameter n are the same. Optionally, n is predefined as one of values as follows.

The first value is:

n=0,1, . . . , $N_{BCH}$–1, where $N_{BCH}$ is the number of resource blocks occupied by the broadcast channel.

The second value is:

n=n', n'+1, . . . , n'+$N_{BCH}$–1, where n' is a predefined integer, and $N_{BCH}$ is the number of resource blocks occupied by the broadcast channel.

The third value is:

n=n', n'+1, . . . , n'+$N_{BCH}$–1, where n'=cell_id mod ($N_{RB}^{max,DL}$+1–$N_{BCH}$), or n'=cell_id mod($N_{RB}^{max,DL}$–$N_{BCH}$), or n'=cell_id modM, $N_{RB}^{max,DL}$ is a maximum system bandwidth, M is an integer no larger than the maximum system bandwidth $N_{RB}^{max,DL}$, cell-id is a cell identity, mod indicates a modulo operation, and $N_{BCH}$ is the number of resource blocks occupied by the broadcast channel.

It is to be noted that, it is not limited in the embodiment how the subcarrier of the complex-valued modulation symbol of the reference signal is determined according to n. Other ways may also be adopted by those skilled in the art.

Step 103 includes: transmitting, by the base station, at the determined antenna port of the reference signal and on the determined subcarrier, the determined complex-valued modulation symbol of the reference signal.

Step 104 includes: determining, by the UE, the antenna port of the reference signal corresponding to the broadcast channel according to presetting or by a blind detection, and determining the subcarrier of the complex-valued modulation symbol of the reference signal of the broadcast channel according to n.

According to the formula (1) or the formula (2) above, it can be seen that in a case that n=0, a corresponding reference signal sequence is mapped to the first physical resource block of the broadcast channel; in a case that n=1, a corresponding reference signal sequence is mapped to the second physical resource block of the PBCH; and so on. That is, the UE can know, according to n, the reference signal sequence mapped to the physical resource blocks occupied by the broadcast channel, without knowing physical resource block numbers of the broadcast channel.

Step 105 includes: receiving, by the UE at the determined antenna port of the reference signal and on the determined subcarrier, the complex-valued modulation symbol of the reference signal, and determining a local complex-valued modulation signal $a_{k,l}^{(p)}$ of the reference signal according to n.

In this step, the way adopted by the UE to determine the local complex-valued modulation signal $a_{k,l}^{(p)}$ of the reference signal is the same as the way adopted by the base station in step 102, and the description thereof is omitted herein.

Step 106 includes: performing channel estimation to demodulate the broadcast channel by the UE according to the received complex-valued modulation signal and the determined local complex-valued modulation signal of the reference signal.

According to the method for transmission of the reference signal provided by the embodiment, the base station transmits to the UE a reference signal used to demodulate a broadcast channel, and determines, according to a predefined first parameter of the reference signal, a complex-valued modulation symbol of the reference signal transmitted to the UE. Because the first parameter of the reference signal is predefined, the UE directly determines, according to the parameter, the complex-valued modulation symbol of the reference signal transmitted by the base station, and then the UE performs channel estimation to demodulate the broadcast channel. Therefore, a carrier of a new carrier type can transmit a broadcast channel, and the UE can directly receive the broadcast channel from the carrier of the new carrier type and then access the carrier of the new carrier type.

Figure 4:
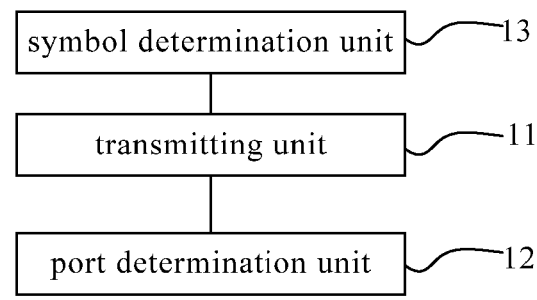
FIG. 4 is a structural block diagram of a base station according to an embodiment of the application.

In correspondence with the foregoing embodiment of the method, a base station is further provided by an embodiment of the application. As shown in FIG. 4. The base station includes:

a port determination unit 11, configured to determine an antenna port of a reference signal corresponding to a broadcast channel;

a symbol determination unit 12, configured to determine a complex-valued modulation symbol of the reference signal according to a first parameter of the reference signal, where the first parameter of the reference signal is determined according to the number of resource blocks occupied by the broadcast channel; and a transmitting unit 13, configured to transmit, at the antenna port of the reference signal determined by the port determination unit 101, the complex-valued modulation symbol of the reference signal determined by the symbol determination unit 12 to a user equipment.

The base station provided by the embodiment of the application transmits to the UE a reference signal used to demodulate a broadcast channel, and determines, according to a first parameter of the reference signal, a complex-valued modulation symbol of the reference signal transmitted to the UE. The UE directly determines, according to the parameter, the complex-valued modulation symbol of the reference signal transmitted by the base station, and then performs channel estimation to demodulate the broadcast channel. Therefore, a carrier of a new carrier type can transmit a broadcast channel, and the UE can directly receive the broadcast channel from the carrier of the new carrier type and then access the carrier of the new carrier type.

Optionally, in an embodiment of the application, the port determination unit 101 is configured to:

determine the antenna port of the reference signal corresponding to the broadcast channel according to presetting.

Figure 5:
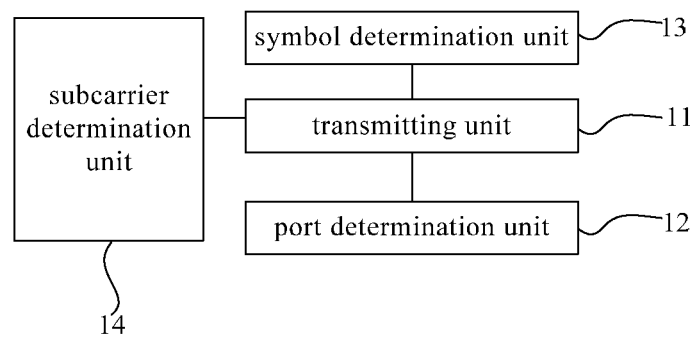
FIG. 5 is another structural block diagram of a base station according to an embodiment of the application.

Optionally, in an embodiment of the application, as shown in FIG. 5, the base station further includes a subcarrier determination unit 14, configured to determine a subcarrier of the complex-valued modulation symbol of the reference signal according to the first parameter of the reference signal. In this case, the transmitting unit 13 is configured to:

transmit, at the antenna port of the reference signal determined by the port determination unit 11 and on the subcarrier determined by the subcarrier determination unit 14, the complex-valued modulation symbol of the reference signal determined by the symbol determination unit 12.

In the embodiment of the application, the antenna port of the reference signal corresponding to the broadcast channel may include:

antenna ports located where resource elements of any two or four antenna ports among antenna ports 7-14 are located; or antenna ports shifting by at least one OFDM symbol or by at least one subcarrier from locations of resource elements of any two or four antenna ports among antenna ports 7-14.

Optionally, in an embodiment of the application, the antenna port of the reference signal corresponding to the broadcast channel determined by the antenna port determination unit 11 includes: two or four antenna ports among antenna ports a, b, c and d, where a, b, c and d are any positive integers.

Under this condition, in a case of a normal cyclic prefix CP, the subcarrier determination unit 14 is configured to:

determine the subcarrier of the complex-valued modulation symbol of the reference signal according to formula (1) as follows, the formula (1) is:

$$k = 5m' + N_{sc}^{RB}n + k' + \frac{N_{RB}^{DL}N_{sc}^{RB}}{2} - 36$$

where $$m' = 0, 1, 2$$

$$k' = \begin{cases} 1 & p \in \{a, b\} \\ 0 & p \in \{c, d\} \end{cases},$$

where k is a subcarrier index, n is the first parameter of the reference signal, $N_{sc}^{RB}$ is the number of subcarriers of a resource block, and $N_{RB}^{DL}$ is a system bandwidth.

The symbol determination unit 12 is configured to:

determine the complex-valued modulation symbol $a_{k,l}^{(p)}$, where p is the antenna port, k is a subcarrier index, and l is an OFDM symbol index, of the reference signal of the broadcast channel according to formula (3) as follows, the formula (3) is:

$$a_{k,l}^{(p)} = w_p(l') \cdot r(3 \cdot l' \cdot N_{RB}^{max,DL} + 3n + m')$$

where $$w_p(i) = \begin{cases} \overline{w}_p(i) & (m' + n)\text{mod}2 = 0 \\ \overline{w}_p(3 - i) & (m' + n)\text{mod}2 = 1 \end{cases}$$

$$l = l' \text{mod} 2 + 5$$

$$l' = \begin{cases} 0, 1 & \text{if } n_s\text{mod}2 = 0 \\ 2, 3 & \text{if } n_s\text{mod}2 = 1 \end{cases}$$

$$m' = 0, 1, 2,$$

a value of $\overline{w}_p(i)$ is:

$$[\overline{w}_p(0) \ \overline{w}_p(1) \ \overline{w}_p(2) \ \overline{w}_p(3)] = \begin{cases} [+1 \ +1 \ -1 \ -1], & p \in a \\ [-1 \ -1 \ +1 \ +1], & p \in b \\ [+1 \ -1 \ -1 \ +1], & p \in c \\ [-1 \ +1 \ +1 \ -1], & p \in d \end{cases},$$

where n is the first parameter of the reference signal, r(x) is a reference signal sequence, $N_{RB}^{max,DL}$ is a maximum system bandwidth, $n_s$ is a slot number, and mod indicates a modulo operation.

In determining the subcarrier by the subcarrier determination unit 14 and the complex-valued modulation symbol by the symbol determination unit 12, values of the first parameter n of the reference signal are the same. Optionally, n is predefined as one of values as follows.

The first value is:

n=0,1, . . . , $N_{BCH}$−1, where $N_{BCH}$ is the number of resource blocks occupied by the broadcast channel.

The second value is:

n=n', n'+1, . . . , n'+$N_{BCH}$−1, where n' is a predefined integer, and $N_{BCH}$ is the number of resource blocks occupied by the broadcast channel.

The third value is:

n=n', n'+1, . . . , n'+$N_{BCH}$−1, where n'=cell_id mod ($N_{RB}^{max,DL}$+1−$N_{BCH}$), or n'=cell_id mod($N_{RB}^{max,DL}$−

$N_{BCH}$), or n'=cell_id modM, $N_{RB}^{max,DL}$ is a maximum system bandwidth, M is an integer no larger than the maximum system bandwidth $N_{RB}^{max,DL}$, cell-id is a cell identity, mod indicates a modulo operation, and $N_{BCH}$ is the number of resource blocks occupied by the broadcast channel.

Under this condition, in a case of an extended CP, optionally, the subcarrier determination unit 14 is configured to:

determine the subcarrier of the complex-valued modulation symbol of the reference signal according to formula (2) as follows, the formula (2) is:

$$k = 3m' + N_{sc}^{RB}n + k' + \frac{N_{RB}^{DL}N_{sc}^{RB}}{2} - 36$$

where $m' = 0, 1, 2, 3$ $$k' = \begin{cases} 1 & \text{if } n_s\bmod 2 = 0 \text{ and } p \in \{a,b\} \\ 2 & \text{if } n_s\bmod 2 = 1 \text{ and } p \in \{a,b\} \end{cases},$$

where k is a subcarrier index, n is the first parameter of the reference signal, $N_{sc}^{RB}$ is the number of subcarriers of a resource block, $N_{RB}^{DL}$ is a system bandwidth, and mod indicates a modulo operation.

The symbol determination unit 12 is configured to:

determine the local complex-valued modulation symbol $a_{k,l}^{(p)}$ of the reference signal of the broadcast channel according to formula (4) as follows, the formula (4) is:

$$a_{k,l}^{(p)} = w_p(l'\bmod 2) \cdot r(4 \cdot l' \cdot N_{RB}^{max,DL} + 4 \cdot n + m'),$$

where $$w_p(i) = \begin{cases} \overline{w}_p(i) & m'\bmod 2 = 0 \\ \overline{w}_p(1-i) & m'\bmod 2 = 1 \end{cases}$$

$l = l'\bmod 2 + 4$ $$l' = \begin{cases} 0, 1 & \text{if } n_s\bmod 2 = 0 \\ 2, 3 & \text{if } n_s\bmod 2 = 1 \end{cases}$$

$m' = 0, 1, 2, 3$ a value of $\overline{w}_p(i)$ is:

$$[\overline{w}_p(0) \quad \overline{w}_p(1)] = \begin{cases} [+1 \ +1], & p \in a \\ [-1 \ +1], & p \in b \end{cases},$$

where n is the first parameter of the reference signal, r(x) is a reference signal sequence, $N_{RB}^{max,DL}$ is a maximum system bandwidth, $n_s$ is a slot number, and mod indicates a modulo operation.

In determining the subcarrier by the subcarrier determination unit 14 and the complex-valued modulation symbol by the symbol determination unit 12, values of the first parameter n of the reference signal are the same. Optionally, n is predefined as one of values as follows.

The first value is:

n=0,1, . . . , $N_{BCH}$−1, where $N_{BCH}$ is the number of resource blocks occupied by the broadcast channel.

The second value is:

n=n', n'+1, . . . , n'+$N_{BCH}$−1, where n' is a predefined integer, and $N_{BCH}$ is the number of resource blocks occupied by the broadcast channel.

The third value is:

n=n', n'+1, . . . , n'+$N_{BCH}$−1, where n'=cell_id mod ($N_{RB}^{max,DL}$+1−$N_{BCH}$), or n'=cell_id mod($N_{RB}^{max,DL}$−$N_{BCH}$), or n'=cell_id modM, $N_{RB}^{max,DL}$ is a maximum system bandwidth, M is an integer no larger than the maximum system bandwidth $N_{RB}^{max,DL}$, cell-id is a cell identity, mod indicates a modulo operation, and $N_{BCH}$ is the number of resource blocks occupied by the broadcast channel.

It is to be noted that, the detailed operation of each unit of the base station provided in the embodiment of the application may refer to the description of the foregoing method embodiment.

It is to be noted that, the base station provided in the embodiment of the application usually includes a processor and a memory, and the above functional units may be provided in the processor.

Figure 6:
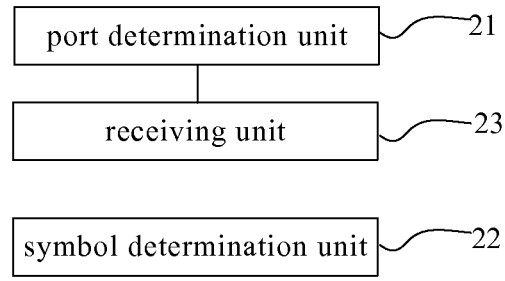
FIG. 6 is a structural block diagram of a UE according to an embodiment of the application.

Correspondingly, a UE is further provided according to an embodiment of the application. As shown in FIG. 6, the UE includes:

a port determination unit 21, configured to determine an antenna port of a reference signal corresponding to a broadcast channel;

a receiving unit 23, configured to receive a complex-valued modulation symbol of the reference signal transmitted by a base station at the antenna port of the reference signal determined by the port determination unit 21.

The UE further includes:

a symbol determination unit 22, configured to determine a local complex-valued modulation signal of the reference signal according to a first parameter of the reference signal, where the first parameter of the reference signal is determined according to the number of resource blocks occupied by the broadcast channel.

Furthermore, in an embodiment of the application, the UE further includes: a channel estimation unit, configured to perform channel estimation to demodulate the broadcast channel according to the complex-valued modulation signal received by the receiving unit 22 and the local complex-valued modulation signal of the reference signal determined by the symbol determination unit 23.

According to the UE provided by the embodiment of the application, the base station transmits to the UE a reference signal used to demodulate a broadcast channel, and determines, according to a first parameter of the reference signal, a complex-valued modulation symbol of the reference signal transmitted to the UE; the UE directly determines, according to the parameter, the complex-valued modulation symbol of the reference signal transmitted by the base station, and performs channel estimation to demodulate the broadcast channel. Therefore, a carrier of a new carrier type can transmit a broadcast channel, and the UE can directly receive the broadcast channel from the carrier of the new carrier type and then access the carrier of the new carrier type.

Optionally, in an embodiment of the application, the port determination unit 21 is configured to:

determine the antenna port of the reference signal corresponding to the broadcast channel according to presetting or by a blind detection.

Figure 7:
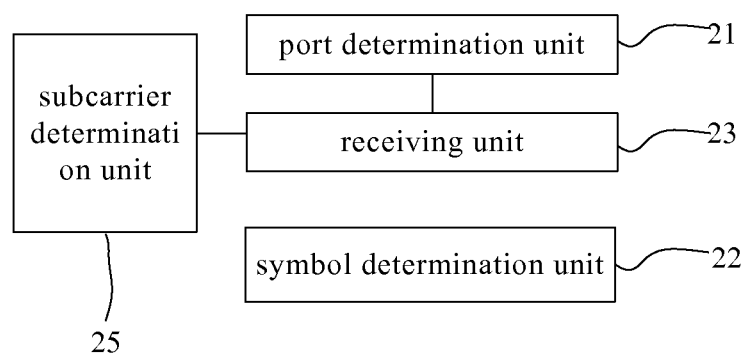
FIG. 7 is another structural block diagram of a UE according to an embodiment of the application.

Optionally, in an embodiment of the application, as shown in FIG. 7, the UE further includes a subcarrier determination unit 25, configured to determine a subcarrier of the complex-valued modulation symbol of the reference signal of the broadcast channel according to the first parameter of the reference signal.

In this case, the receiving unit 23 is configured to receive the complex-valued modulation symbol of the reference signal transmitted by the base station at the antenna port of the reference signal determined by the port determination unit 21 and on the subcarrier determined by the subcarrier determination unit 25.

In the embodiment of the application, the antenna port of the reference signal corresponding to the broadcast channel includes: antenna ports located where resource elements of any two or four antenna ports among antenna ports 7-14 are located, or antenna ports shifting by at least one OFDM symbol or by at least one subcarrier from locations of resource elements of any two or four antenna ports among antenna ports 7-14.

Furthermore, in an embodiment of the application, the antenna port of the reference signal corresponding to the broadcast channel determined by the port determination unit 21 includes:

two or four antenna ports among antenna ports a, b, c and d, where a, b, c and d are any positive integers.

Under this condition, in a case of a normal cyclic prefix CP, the subcarrier determination unit 25 is configured to:

determine a subcarrier of the complex-valued modulation symbol of the reference signal according to formula (1) as follows, the formula (1) is:

$$k = 5m' + N_{sc}^{RB} n + k' + \frac{N_{RB}^{DL} N_{sc}^{RB}}{2} - 36$$

where $m' = 0, 1, 2$ $k' = \begin{cases} 1 & p \in \{a, b\} \\ 0 & p \in \{c, d\} \end{cases}$, where k is a subcarrier index, n is the first parameter of the reference signal, $N_{sc}^{RB}$ is the number of subcarriers of a resource block, and $N_{RB}^{DL}$ is a system bandwidth.

The symbol determination unit 22 is configured to:

determine the local complex-valued modulation symbol $a_{k,l}^{(p)}$, where p is the antenna port, k is a subcarrier index, and l is an OFDM symbol index, of the reference signal of the broadcast channel according to formula (3) as follows, the formula (3) is:

$$a_{k,l}^{(p)} = w_p(l') \cdot r(3 \cdot l' \cdot N_{RB}^{max,DL} + 3n + m')$$

where $w_p(i) = \begin{cases} \overline{w}_p(i) & (m'+n) \mod 2 = 0 \\ \overline{w}_p(3-i) & (m'+n) \mod 2 = 1 \end{cases}$ $l = l' \mod 2 + 5$ $l' = \begin{cases} 0, 1 & \text{if } n_s \mod 2 = 0 \\ 2, 3 & \text{if } n_s \mod 2 = 1 \end{cases}$ $m' = 0, 1, 2$ a value of $\overline{w}_p(i)$ is as follows:

$[\overline{w}_p(0) \ \overline{w}_p(1) \ \overline{w}_p(2) \ \overline{w}_p(3)] = \begin{cases} [+1 \ +1 \ -1 \ -1], & p \in a \\ [-1 \ -1 \ +1 \ +1], & p \in b \\ [+1 \ -1 \ -1 \ +1], & p \in c \\ [-1 \ +1 \ +1 \ -1], & p \in d \end{cases}$, where n is the first parameter of the reference signal, r(x) is a reference signal sequence, $N_{RB}^{max,DL}$ is a maximum system bandwidth, $n_s$ is a slot number, and mod indicates a modulo operation.

In determining the subcarrier by the subcarrier determination unit 25 and the local complex-valued modulation symbol by the symbol determination unit 22, values of the first parameter n of the reference signal are the same. Optionally, n is predefined as one of values as follows.

The first value is:

$n = 0, 1, \ldots, N_{BCH}-1$, where $N_{BCH}$ is the number of resource blocks occupied by the broadcast channel.

The second value is:

$n = n', n'+1, \ldots, n'+N_{BCH}-1$, where n' is a predefined integer, and $N_{BCH}$ is the number of resource blocks occupied by the broadcast channel.

The third value is:

$n = n', n'+1, \ldots, n'+N_{BCH}-1$, where $n' = \text{cell\_id} \mod (N_{RB}^{max,DL}+1-N_{BCH})$, or $n' = \text{cell\_id} \mod(N_{RB}^{max,DL}-N_{BCH})$, or $n' = \text{cell\_id} \mod M$, $N_{RB}^{max,DL}$ is a maximum system bandwidth, M is an integer no larger than the maximum system bandwidth $N_{RB}^{max,DL}$, cell-id is a cell identity, mod indicates a modulo operation, and $N_{BCH}$ is the number of resource blocks occupied by the broadcast channel.

Under this condition, in a case of an extended CP, the subcarrier determination unit 25 is configured to:

determine the local complex-valued modulation symbol of the reference signal of the broadcast channel according to formula (4) as follows, the formula (4) is:

$$a_{k,l}^{(p)} = w_p(l' \mod 2) \cdot r(4 \cdot l' \cdot N_{RB}^{max,DL} + 4 \cdot n + m'),$$

where $w_p(i) = \begin{cases} \overline{w}_p(i) & m' \mod 2 = 0 \\ \overline{w}_p(1-i) & m' \mod 2 = 1 \end{cases}$ $l = l' \mod 2 + 4$ $l' = \begin{cases} 0, 1 & \text{if } n_s \mod 2 = 0 \\ 2, 3 & \text{if } n_s \mod 2 = 1 \end{cases}$ $m' = 0, 1, 2, 3$ a value of $\overline{w}_p(i)$ is:

$[\overline{w}_p(0) \ \overline{w}_p(1)] = \begin{cases} [+1 \ +1], & p \in a \\ [-1 \ +1], & p \in b \end{cases}$, where n is the first parameter of the reference signal, r(x) is a reference signal sequence, $N_{RB}^{max,DL}$ is a maximum system bandwidth, $n_s$ is a slot number, and mod indicates a modulo operation.

In determining the subcarrier by the subcarrier determination unit 25 and the complex-valued modulation symbol by the symbol determination unit 22, values of the first parameter n of the reference signal are the same. Optionally, n is predefined as one of values as follows.

The first value is:

n=0,1, . . . , $N_{BCH}$−1, where $N_{BCH}$ is the number of resource blocks occupied by the broadcast channel.

The second value is:

n=n', n'+1, . . . , n'+$N_{BCH}$−1, where n' is a predefined integer, and $N_{BCH}$ is the number of resource blocks occupied by the broadcast channel.

The third value is:

n=n', n'+1, . . . , n'+$N_{BCH}$−1, where n'=cell_id mod ($N_{RB}^{max,DL}$+1−$N_{BCH}$), or n'=cell_id mod($N_{RB}^{max,DL}$−$N_{BCH}$), or n'=cell_id modM, $N_{RB}^{max,DL}$ is a maximum system bandwidth, M is an integer no larger than the maximum system bandwidth $N_{RB}^{max,DL}$, cell-id is a cell identity, mod indicates a modulo operation, and $N_{BCH}$ is the number of resource blocks occupied by the broadcast channel.

It is to be noted that the detailed operation of each unit of the UE provided in the embodiment of the application may refer to the description of the foregoing method embodiment.

It is to be noted that, the UE provided in the embodiment of the application usually includes a processor and a memory, and the above functional units may be provided in the processor.

It is to be noted that in the above embodiments of the user equipment and the base station, the units included are separated according to functional logic but are not limited to the above separation, as long as the corresponding functions can be achieved. In addition, names of the functional units are merely for convenience of distinguishing each other, but are not to limit the scope of the application.

It can be understood by those skilled in the art that all or a few steps in the above method embodiments may be accomplished by programs instructing related hardware. The programs may be stored in a computer readable storage medium, and the storage medium may be a read only memory, a disk or a CD, etc.

A method for transmission of a reference signal used to demodulate a broadcast channel is further provided according to an embodiment of the application. As shown in FIG. 8, the method is performed by a base station and the method includes steps 301-303.

Step 301 includes: determining an antenna port of a reference signal corresponding to a broadcast channel, where the antenna port of the reference signal includes antenna ports {a, b, c, d}.

The antenna ports of the reference signal corresponding to the broadcast channel are preset.

In an implementation of the embodiment of the application, locations of resource elements corresponding to the antenna port c and the antenna port d are only mapped to resource elements on OFDM symbol 1 in slot 1. In another implementation, locations of resource elements corresponding to the antenna port c and the antenna port d are only mapped to resource elements on OFDM symbol 1 in slot 0. In another implementation, locations of resource elements corresponding to the antenna port c and the antenna port d are only mapped to a resource element on OFDM symbol 3 in slot 0 and to a resource element on OFDM symbol 1 in slot 1. In another implementation, locations of resource elements corresponding to the antenna port c and the antenna port d are only mapped to a resource element on OFDM symbol 2 in slot 0 and to a resource element on OFDM symbol 1 in slot 1. In another implementation, locations of resource elements corresponding to the antenna port c and the antenna port d are only mapped to a resource element on OFDM symbol 3 in slot 0 and to a resource element on OFDM symbol 1 in slot 0. In another implementation, locations of resource elements corresponding to the antenna port c and the antenna port d are only mapped to a resource element on OFDM symbol 2 in slot 0 and to a resource element on OFDM symbol 1 in slot 0. In the above implementations, the distribution of the resource elements corresponding to the antenna port c and the antenna port d can effectively prevent conflict on OFDM symbols between the reference signal and a synchronous channel.

Physical locations of the antenna ports b and a are not limited in this application. In an embodiment of the application, the antenna ports b and a are antenna ports respectively located where resource elements of the antenna ports 0 and 1 are located.

Step 302 includes: determining a complex-valued modulation symbol of the reference signal of the broadcast channel.

For example, locations of resource elements corresponding to the antenna port c and the antenna port d are only mapped to resource elements on OFDM symbol 1 in slot 1, then in this step, the base station may determine the complex-valued modulation symbol $a_{k,l}^{(p)}$, where p is the antenna port, k is a subcarrier index, and l is an OFDM symbol index, of the reference signal of the broadcast channel according to a formula as follows:

$$a_{k,l}^{(p)} = r_{l,n_s}(m')$$

where $$k = 6m + (v + v_{shift}) \bmod 6$$

$$l = \begin{cases} 0, N_{symb}^{DL} - 3 & \text{if } p \in \{a, b\} \\ 1 & \text{if } n_s \bmod 2 = 1 \text{ and } p \in \{c, d\} \end{cases}$$

$$m = N_{RB}^{DL} - 6, N_{RB}^{DL} - 5, \ldots, N_{RB}^{DL} + 5$$

$$m' = m + N_{RB}^{max,DL} - N_{RB}^{DL}$$

$$v = \begin{cases} 0 & \text{if } p = a \text{ and } l = 0 \\ 3 & \text{if } p = a \text{ and } l \neq 0 \\ 3 & \text{if } p = b \text{ and } l = 0 \\ 0 & \text{if } p = b \text{ and } l \neq 0 \\ 3(n_s \bmod 2) & \text{if } p = c \\ 3 + 3(n_s \bmod 2) & \text{if } p = d \end{cases}$$

$$v_{shift} = N_{ID}^{cell} \bmod 6$$

where $n_s$ is a slot number, $N_{RB}^{DL}$ is a system bandwidth, $N_{RB}^{max,DL}$ is a maximum system bandwidth, $N_{symb}^{DL}$ is the number of OFDM symbols, and mod indicates a modulo operation;

r(x) is a reference signal sequence, which may be determined in a way that a cell-specific reference signal is determined in LTE Release-8/LTE Release-9/LTE Release-10, as follows:

$$r_{l,n_s}(x) = \frac{1}{\sqrt{2}}(1 - 2 \cdot c(2x)) + j\frac{1}{\sqrt{2}}(1 - 2 \cdot c(2x+1)),$$

$$x = 0, 1, \ldots, 2N_{RB}^{max,DL} - 1$$

where $N_{RB}^{max,DL}$ is a maximum system bandwidth, which is usually 110.

c(i) is a Gold sequence initialized as:

$$c_{init} = 2^{10} \cdot (7 \cdot (n_s+1)+l+1) \cdot (2 \cdot N_{ID}^{cell}+1) + 2 \cdot N_{ID}^{cell} + N_{CP}$$

where $n_s$ is a slot number, and $N_{ID}^{cell}$ is a cell number;

$$N_{CP} = \begin{cases} 1 & \text{normal } CP \\ 0 & \text{extended } CP \end{cases}$$

For example, locations of resource elements corresponding to the antenna port c and the antenna port d are only mapped to a resource element on OFDM symbol 3 in slot 0 and a resource element on OFDM symbol 1 in slot 1, then in this step, the complex-valued modulation symbol $a_{k,l}^{(p)}$, where p is the antenna port, k is a subcarrier index, and l is an OFDM symbol index, of the reference signal of the broadcast channel may be determined by the base station according to a formula as follows:

$$a_{k,l}^{(p)} = r_{l,n_s}(m')$$

where $k = 6m + (v + v_{shift}) \bmod 6$ $$l = \begin{cases} 0, N_{symb}^{DL} - 3 & \text{if } p \in \{a, b\} \\ 3 & \text{if } n_s \bmod 2 = 0 \text{ and } p \in \{c, d\} \\ 1 & \text{if } n_s \bmod 2 = 1 \text{ and } p \in \{c, d\} \end{cases}$$

$m = N_{RB}^{DL} - 6, N_{RB}^{DL} - 5, \ldots, N_{RB}^{DL} + 5$ $m' = m + N_{RB}^{max,DL} - N_{RB}^{DL}$ $$v = \begin{cases} 0 & \text{if } p = a \text{ and } l = 0 \\ 3 & \text{if } p = a \text{ and } l \neq 0 \\ 3 & \text{if } p = b \text{ and } l = 0 \\ 0 & \text{if } p = b \text{ and } l \neq 0 \\ 3(n_s \bmod 2) & \text{if } p = c \\ 3 + 3(n_s \bmod 2) & \text{if } p = d \end{cases}$$

$v_{shift} = N_{ID}^{cell} \bmod 6$ where $n_s$ is a slot number, $N_{RB}^{DL}$ is a system bandwidth, $N_{RB}^{max,DL}$ is a maximum system bandwidth, $N_{symb}^{DL}$ is an OFDM symbol index, mod indicates a modulo operation; and r(x) is the same as that in the former example and is not repeated herein.

It can be understood that, in other implementations of the antenna ports c and d, the way to determine the complex-valued modulation symbol is the same as the way in the former specific examples, and is not repeated herein. The complex-valued modulation symbol can be determined by those skilled in the art in other implementations of the antenna ports c and d.

Step 303 includes: transmitting, at the determined antenna port of the reference signal, the determined complex-valued modulation symbol of the reference signal.

According to the method for transmission of the reference signal provided by the embodiment of the application, the base station transmits to the UE, at a specific antenna port, a reference signal used to demodulate a broadcast channel. Therefore, a carrier of a new carrier type can transmit a broadcast channel, and the UE can directly receive the broadcast channel from the carrier of the new carrier type and then access the carrier of the new carrier type.

Correspondingly, a method for transmission of a reference signal is further provided according to an embodiment of the application. The reference signal is used to demodulate a broadcast channel. The method is performed by a UE, and as shown in FIG. 9, the method includes steps 401 and 402.

Step 401 includes: determining an antenna port of a reference signal corresponding to a broadcast channel, where the antenna port of the reference signal includes antenna ports {a, b, c, d}.

The antenna ports of the reference signal corresponding to the broadcast channel are preset.

In an implementation of the embodiment of the application, locations of resource elements corresponding to the antenna port c and the antenna port d are only mapped to resource elements on OFDM symbol 1 in slot 1. In another implementation, locations of resource elements corresponding to the antenna port c and the antenna port d are only mapped to resource elements on OFDM symbol 1 in slot 0. In another implementation, locations of resource elements corresponding to the antenna port c and the antenna port d are only mapped to a resource element on OFDM symbol 3 in slot 0 and to a resource element on OFDM symbol 1 in slot 1. In another implementation, locations of resource elements corresponding to the antenna port c and the antenna port d are only mapped to a resource element on OFDM symbol 2 in slot 0 and to a resource element on OFDM symbol 1 in slot 1. In another implementation, locations of resource elements corresponding to the antenna port c and the antenna port d are only mapped to a resource element on OFDM symbol 3 in slot 0 and to a resource element on OFDM symbol 1 in slot 0. In another implementation, locations of resource elements corresponding to the antenna port c and the antenna port d are only mapped to a resource element on OFDM symbol 2 in slot 0 and to a resource element on OFDM symbol 1 in slot 0. In the above implementations, the distribution of the resource elements corresponding to the antenna port c and the antenna port d can effectively prevent conflict on OFDM symbols between the reference signal and a synchronous channel.

Physical locations of the antenna ports b and a are not limited in this application. In an embodiment of the application, the antenna ports b and a are antenna ports respectively located where resource elements of the antenna ports 0 and 1 are located.

Step 402 includes: receiving, at the determined antenna port of the reference signal, a complex-valued modulation symbol of the reference signal, and then demodulating the broadcast channel.

The UE determines a local complex-valued modulation signal of the reference signal, and then performs channel estimation according to the received complex-valued modulation signal and the determined local complex-valued modulation signal of the reference signal, to demodulate the broadcast channel.

The way that the UE determines the local complex-valued modulation signal of the reference signal is the same as the same way that the base station determines the complex-valued modulation signal in the foregoing embodiments, and the detailed description is omitted herein.

According to the method for transmission of the reference signal provided by the embodiment of the application, the base station transmits to the UE, at a specific antenna port, a reference signal used to demodulate a broadcast channel. Therefore, a carrier of a new carrier type can transmit a broadcast channel, and the UE can directly receive the broadcast channel from the carrier of the new carrier type and then access the carrier of the new carrier type.

Figure 10:
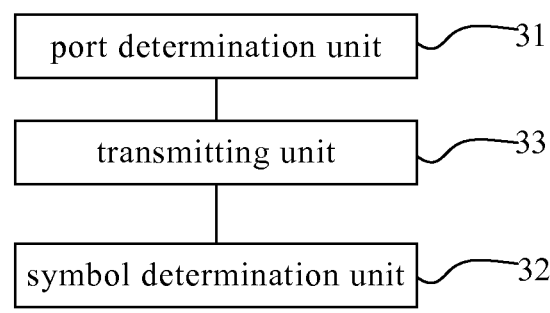
FIG. 10 is a structural block diagram of a base station according to an embodiment of the application.

In correspondence with the foregoing method, a base station is further provided according to an embodiment of the application. As shown in FIG. 10, the base station includes:

a port determination unit 31, configured to determine an antenna port of a reference signal corresponding to a broadcast channel, where the antenna port of the reference signal includes antenna ports {a, b, c, d}, where locations of resource elements corresponding to the antenna port c and the antenna port d are only mapped to resource elements on OFDM symbol 1 in slot 1, or locations of resource elements corresponding to the antenna port c and the antenna port d are only mapped to resource elements on OFDM symbol 1 in slot 0, or locations of resource elements corresponding to the antenna port c and the antenna port d are only mapped to a resource element on OFDM symbol 3 in slot 0 and to a resource element on OFDM symbol 1 in slot 1, or locations of resource elements corresponding to the antenna port c and the antenna port d are only mapped to a resource element on OFDM symbol 2 in slot 0 and to a resource element on OFDM symbol 1 in slot 1, or locations of resource elements corresponding to the antenna port c and the antenna port d are only mapped to a resource element on OFDM symbol 3 in slot 0 and to a resource element on OFDM symbol 1 in slot 0, or locations of resource elements corresponding to the antenna port c and the antenna port d are only mapped to a resource element on OFDM symbol 2 in slot 0 and to a resource element on OFDM symbol 1 in slot 0;

a symbol determination unit 32, configured to determine a complex-valued modulation symbol of the reference signal of the broadcast channel; and a transmitting unit 33, configured to transmit, at the antenna port of the reference signal determined by the port determination unit 32, the complex-valued modulation symbol of the reference signal determined by the symbol determination unit 32.

It is to be noted that physical locations of the antenna ports b and a are not limited in this application. In an embodiment of the application, the antenna ports b and a are antenna ports respectively located where resource elements of the antenna ports 0 and 1 are located.

According to the UE provided by the embodiment of the application, the base station transmits to the UE, at a specific antenna port, a reference signal used to demodulate a broadcast channel. Therefore, a carrier of a new carrier type can transmit a broadcast channel, and the UE can directly receive the broadcast channel from the carrier of the new carrier type and then access the carrier of the new carrier type.

It is to be noted that the base station provided by the embodiment usually includes a processor and a memory, and the above functional units may be provided in the processor.

Figure 11:
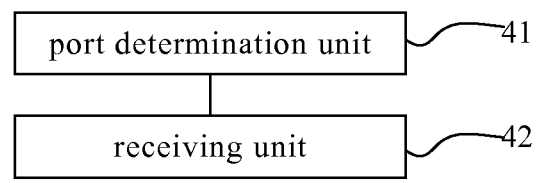
FIG. 11 is a structural block diagram of a UE according to an embodiment of the application.

In correspondence with the foregoing method, a user equipment is further provided according to an embodiment of the application. As shown in FIG. 11, the user equipment includes:

a port determination unit 41, configured to determine an antenna port of a reference signal corresponding to a broadcast channel, where the antenna port of the reference signal includes antenna ports {a, b, c, d}, where locations of resource elements corresponding to the antenna port c and the antenna port d are only mapped to resource elements on OFDM symbol 1 in slot 1, or locations of resource elements corresponding to the antenna port c and the antenna port d are only mapped to resource elements on OFDM symbol 1 in slot 0, or locations of resource elements corresponding to the antenna port c and the antenna port d are only mapped to a resource element on OFDM symbol 3 in slot 0 and to a resource element on OFDM symbol 1 in slot 1, or locations of resource elements corresponding to the antenna port c and the antenna port d are only mapped to a resource element on OFDM symbol 2 in slot 0 and to a resource element on OFDM symbol 1 in slot 1, or locations of resource elements corresponding to the antenna port c and the antenna port d are only mapped to a resource element on OFDM symbol 3 in slot 0 and to a resource element on OFDM symbol 1 in slot 0, or locations of resource elements corresponding to the antenna port c and the antenna port d are only mapped to a resource element on OFDM symbol 2 in slot 0 and to a resource element on OFDM symbol 1 in slot 0; and a receiving unit 42, configured to receive, at the antenna port of the reference signal determined by the port determination unit 41, a complex-valued modulation symbol of the reference signal, so as to demodulate the broadcast channel.

It is to be noted that physical locations of the antenna ports b and a are not limited in this application. In an embodiment of the application, the antenna ports b and a are antenna ports respectively located where resource elements of the antenna ports 0 and 1 are located.

According to the UE provided by the embodiment of the application, the base station transmits to the UE, at a specific antenna port, a reference signal used to demodulate a broadcast channel. Therefore, a carrier of a new carrier type can transmit a broadcast channel, and the UE can directly receive the broadcast channel from the carrier of the new carrier type and then access the carrier of the new carrier type.

It is to be noted that the UE provided by the embodiment usually includes a processor and a memory, and the above functional units may be provided in the processor.

It is to be note that in the above embodiments of the user equipment and the base station, the units included are separated according to functional logic, but are not limited to the above separation, as long as corresponding functions can be achieved. In addition, names of the functional units are merely for convenience of distinguishing each other, but are not to limit the scope of the application.

It can be understood by those skilled in the art that all or a few steps in the above method embodiments may be accomplished by programs instructing related hardware. The programs may be stored in a computer readable storage medium, and the storage medium may be a read only memory, a disk or a CD, etc.

The described above are merely specific embodiments of the application. However, the scope of the application is not limited to the specific embodiments. Any modification or substitution within the technical scope disclosed in the application and obvious to those skilled in the art is covered within the scope of the application. Therefore, the scope of the application shall be as defined in the appended claims.

The invention claimed is:

1. A method for transmission of a reference signal, comprising:

determining, by a base station, an antenna port of a reference signal corresponding to a broadcast channel;

determining, by the base station, a complex-valued modulation symbol of the reference signal according to a first parameter of the reference signal, wherein the first parameter of the reference signal is determined according to the number of resource blocks occupied by the broadcast channel; and transmitting, by the base station, at the determined antenna port of the reference signal, the determined complex-valued modulation symbol of the reference signal to a user equipment, determining, by the base station, a subcarrier of the complex-valued modulation symbol of the reference signal according to the first parameter of the reference signal, wherein the transmitting, by the base station, at the determined antenna port of the reference signal, the determined complex-valued modulation symbol of the reference signal to the user equipment, comprises:
transmitting, by the base station, at the determined antenna port of the reference signal and on the determined subcarrier, the determined complex-valued modulation symbol of the reference signal to the user equipment, and wherein the antenna port of the reference signal corresponding to the broadcast channel comprises: two or four antenna ports among antenna ports a, b, c and d, wherein a, b, c and d are any positive integers, wherein determining, by the base station, the subcarrier of the complex-valued modulation symbol of the reference signal according to the first parameter of the reference signal comprises:

in a case of a normal cyclic prefix (CP), determining, by the base station, the subcarrier of the complex-valued modulation symbol of the reference signal according to formula (1) as follows:

the formula (1) is:

$$k = 5m' + N_{sc}^{RB}n + k' + \frac{N_{RB}^{DL}N_{sc}^{RB}}{2} - 36$$

wherein $m' = 0, 1, 2,$ $$k' = \begin{cases} 1 & p \in \{a, b\} \\ 0 & p \in \{c, d\} \end{cases},$$

wherein k is a subcarrier index, n is the first parameter of the reference signal, $N_{sc}^{RB}$ is the number of subcarriers of a resource block, $N_{RB}^{DL}$ is a system bandwidth, and p is the antenna port of the reference signal;

or, in a case of an extended CP, determining, by the base station, the subcarrier of the complex-valued modulation symbol of the reference signal according to formula (2) as follows:

the formula (2) is:

$$k = 3m' + N_{sc}^{RB}n + k' + \frac{N_{RB}^{DL}N_{sc}^{RB}}{2} - 36$$

wherein $m' = 0, 1, 2, 3,$

-continued $$k' = \begin{cases} 1 & \text{if } n_s \bmod 2 = 0 \text{ and } p \in \{a, b\} \\ 2 & \text{if } n_s \bmod 2 = 1 \text{ and } p \in \{a, b\} \end{cases},$$

wherein k is a subcarrier index, n is the first parameter of the reference signal, $N_{sc}^{RB}$ is the number of subcarriers of a resource block, $N_{RB}^{DL}$ is a system bandwidth, p is the antenna port of the reference signal, and mod indicates a modulo operation.

2. The method according to claim 1, wherein the antenna port of the reference signal corresponding to the broadcast channel comprises:
antenna ports located where resource elements of any two or four of antenna ports 7-14 are located; or
antenna ports shifting by at least one orthogonal frequency-division multiplexing (OFDM) symbol or by at least one subcarrier from locations of resource elements of any two or four of antenna ports 7-14.

3. The method according to claim 1, wherein the antenna port of the reference signal corresponding to the broadcast channel comprises:
antenna ports located where resource elements of any two or four of antenna ports 7-14 are located; or
antenna ports shifting by at least one OFDM symbol or by at least one subcarrier from locations of resource elements of any two or four of antenna ports 7-14.

4. The method according to claim 1, wherein determining, by the base station, the complex-valued modulation symbol of the reference signal according to the first parameter of the reference signal comprises:
in a case of a normal cyclic prefix (CP), determining, by the base station, the complex-valued modulation symbol $a_{k,l}^{(p)}$ of the reference signal of the broadcast channel according to formula (3) as follows, wherein P is the antenna port, k is a subcarrier index, and l is an OFDM symbol index, the formula (3) is:

$$a_{k,l}^{(p)} = w_p(l') \cdot r(3 \cdot l' \cdot N_{RB}^{max,DL} + 3n + m')$$

wherein $$w_p(i) = \begin{cases} \overline{w}_p(i) & (m' + n) \bmod 2 = 0 \\ \overline{w}_p(3 - i) & (m' + n) \bmod 2 = 1 \end{cases}$$

$l = l' \bmod 2 + 5$ $$l' = \begin{cases} 0, 1 & \text{if } n_s \bmod 2 = 0 \\ 2, 3 & \text{if } n_s \bmod 2 = 1 \end{cases}$$

$m' = 0, 1, 2,$ a value of $\overline{w}_p(i)$ is:

$$[\overline{w}_p(0) \ \overline{w}_p(1) \ \overline{w}_p(2) \ \overline{w}_p(3)] = \begin{cases} [+1 \ +1 \ -1 \ -1], & p \in a \\ [-1 \ -1 \ +1 \ +1], & p \in b \\ [+1 \ -1 \ -1 \ +1], & p \in c \\ [-1 \ +1 \ +1 \ -1], & p \in d \end{cases},$$

wherein n is the first parameter of the reference signal, r(x) is a reference signal sequence, $N_{RB}^{max,DL}$ is a maximum system bandwidth, $n_s$ is a slot number, and mod indicates a modulo operation;

or,
in a case of an extended CP, determining, by the base station, the complex-valued modulation symbol $a_{k,l}^{(p)}$ of the reference signal according to formula (4) as follows,
the formula (4) is:

$$a_{k,l}^{(p)} = w_p(l' \bmod 2) \cdot r(4 \cdot l' \cdot N_{RB}^{max,DL} + 4 \cdot n + m'),$$

wherein $$w_p(i) = \begin{cases} \overline{w}_p(i) & m' \bmod 2 = 0 \\ \overline{w}_p(1-i) & m' \bmod 2 = 1 \end{cases}$$

$$l = l' \bmod 2 + 4$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, 2, 3$$

a value of $\overline{w}_p(i)$ is:

$$[\overline{w}_p(0) \quad \overline{w}_p(1)] = \begin{cases} [+1 \quad +1], & p \in a \\ [-1 \quad +1], & p \in b \end{cases},$$

wherein n is the first parameter of the reference signal, r (x) is a reference signal sequence, $N_{RB}^{max,DL}$ is a maximum system bandwidth, $n_s$ is a slot number, and mod indicates a modulo operation.

5. The method according to claim 1, wherein the first parameter n of the reference signal comprises one of values as follows:
n=n', n'+1, ..., n'+$N_{BCH}$-1, wherein n' is any predefined integer, and $N_{BCH}$ is the number of resource blocks occupied by the broadcast channel; or
n=n', n'+1, ..., n'+$N_{BCH}$-1, wherein n'=cell_id mod ($N_{RB}^{max,DL}$+1-$N_{BCH}$), or n'=cell_id mod($N_{RB}^{max,DL}$-$N_{BCH}$), or n'=cell_id modM, $N_{RB}^{max,DL}$ is a maximum system bandwidth, M is an integer no larger than the maximum system bandwidth $N_{RB}^{max,DL}$, cell-id is a cell identity, mod indicates a modulo operation, and $N_{BCH}$ is the number of resource blocks occupied by the broadcast channel.

6. The method according to claim 1, wherein
the first parameter n of the reference signal comprises one of values as follows:
n=n', n'+1, ..., n'+$N_{BCH}$-1, wherein n' is any predefined integer, and $N_{BCH}$ is the number of resource blocks occupied by the broadcast channel; or
n=n', n'+1, ..., n'+$N_{BCH}$-1, wherein n'=cell_id mod ($N_{RB}^{max,DL}$+1-$N_{BCH}$), or n'=cell_id mod($N_{RB}^{max,DL}$-$N_{BCH}$), or n'=cell_id modM, $N_{RB}^{max,DL}$ is a maximum system bandwidth, M is an integer no larger than the maximum system bandwidth $N_{RB}^{max,DL}$, cell-id is a cell identity, mod indicates a modulo operation, and $N_{BCH}$ is the number of resource blocks occupied by the broadcast channel.

7. A base station, comprising a processor and a non-transitory processor-readable medium having processor-executable instructions stored thereon, the processor-executable instructions comprising a plurality of units, the units comprising:
a port determination unit, configured to determine an antenna port of a reference signal corresponding to a broadcast channel;
a symbol determination unit, configured to determine a complex-valued modulation symbol of the reference signal according to a first parameter of the reference signal, wherein the first parameter of the reference signal is determined according to the number of resource blocks occupied by the broadcast channel; and
a transmitting unit, configured to transmit, at the antenna port of the reference signal determined by the port determination unit, the complex-valued modulation symbol of the reference signal determined by the symbol determination unit to a user equipment,
a subcarrier determination unit, configured to determine a subcarrier of the complex-valued modulation symbol of the reference signal according to the first parameter of the reference signal;
wherein the transmitting unit is configured to transmit, at the antenna port of the reference signal determined by the port determination unit and on the subcarrier determined by the subcarrier determination unit, the complex-valued modulation symbol of the reference signal determined by the symbol determination unit to the user equipment,
wherein the antenna port of the reference signal corresponding to the broadcast channel determined by the port determination unit comprises: two or four antenna ports among antenna ports a, b, c and d, wherein a, b, c and d are any positive integers; and
wherein the subcarrier determination unit is configured to:
in a case of a normal cyclic prefix (CP), determine the subcarrier of the complex-valued modulation symbol of the reference signal according to formula (1) as follows, the formula (1) is:

$$k = 5m' + N_{sc}^{RB}n + k' + \frac{N_{RB}^{DL}N_{sc}^{RB}}{2} - 36$$

wherein $$m' = 0, 1, 2$$

$$k' = \begin{cases} 1 & p \in \{a, b\} \\ 0 & p \in \{c, d\} \end{cases},$$

wherein k is a subcarrier index, n is the first parameter of the reference signal, $N_{sc}^{RB}$ is the number of subcarriers of a resource block, and $N_{RB}^{DL}$ is a system bandwidth; or,
in a case of an extended CP, determine the subcarrier of the complex-valued modulation symbol of the reference signal according to formula (2) as follows, the formula (2) is:

$$k = 3m' + N_{sc}^{RB}n + k' + \frac{N_{RB}^{DL}N_{sc}^{RB}}{2} - 36$$

wherein, $$m' = 0, 1, 2, 3$$

$$k' = \begin{cases} 1 & \text{if } n_s \bmod 2 = 0 \text{ and } p \in \{a, b\} \\ 2 & \text{if } n_s \bmod 2 = 1 \text{ and } p \in \{c, d\} \end{cases},$$

wherein k is a subcarrier index, n is the first parameter of the reference signal, $N_{sc}^{RB}$ is the number of subcarriers of a resource block, $N_{RB}^{DL}$ is a system bandwidth, and mod indicates a modulo operation.

8. The base station according to claim 7, wherein
the antenna port of the reference signal corresponding to the broadcast channel comprises:
antenna ports located where resource elements of any two or four of antenna ports 7-14 are located; or
antenna ports shifting by at least one orthogonal frequency-division multiplexing (OFDM) symbol or by at least one subcarrier from locations of resource elements of any two or four of antenna ports 7-14.

9. The base station according to claim 7, wherein
the symbol determination unit is configured to:
in a case of a normal cyclic prefix (CP), determine the complex-valued modulation symbol $a_{k,l}^{(p)}$ of the reference signal of the broadcast channel according to formula (3) as follows, wherein P is the antenna port, k is a subcarrier index, and l is an OFDM symbol index, the formula (3) is:

$$a_{k,l}^{(p)} = w_p(l') \cdot r(3 \cdot l' \cdot N_{RB}^{max,DL} + 3n + m')$$

wherein $$w_p(i) = \begin{cases} \overline{w}_p(i) & (m'+n) \bmod 2 = 0 \\ \overline{w}_p(3-i) & (m'+n) \bmod 2 = 1 \end{cases}$$

$$l = l' \bmod 2 + 5$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, 2,$$

a value of $\overline{w}_p(i)$ is:

$$[\overline{w}_p(0) \ \overline{w}_p(1) \ \overline{w}_p(2) \ \overline{w}_p(3)] = \begin{cases} [+1 \ +1 \ -1 \ -1], & p \in a \\ [-1 \ -1 \ +1 \ +1], & p \in b \\ [+1 \ -1 \ -1 \ +1], & p \in c \\ [-1 \ +1 \ +1 \ -1], & p \in d \end{cases}$$

wherein n is the first parameter of the reference signal, r(x) is a reference signal sequence, $N_{RB}^{max,DL}$ is a maximum system bandwidth, $n_s$ is a slot number, and mod indicates a modulo operation;
or,
in a case of an extended CP, determine the complex-valued modulation symbol $a_{k,l}^{(p)}$ of the reference signal of the broadcast channel according to formula (4) as follows,
the formula (4) is:

$$a_{k,l}^{(p)} = w_p(l' \bmod 2) \cdot r(4 \cdot l' \cdot N_{RB}^{max,DL} + 4 \cdot n + m'),$$

wherein $$w_p(i) = \begin{cases} \overline{w}_p(i) & m' \bmod 2 = 0 \\ \overline{w}_p(1-i) & m' \bmod 2 = 1 \end{cases}$$

$$l = l' \bmod 2 + 4$$

$$l' = \begin{cases} 0, 1 & \text{if } n_s \bmod 2 = 0 \\ 2, 3 & \text{if } n_s \bmod 2 = 1 \end{cases}$$

$$m' = 0, 1, 2, 3$$

a value of $\overline{w}_p(i)$ is:

$$[\overline{w}_p(0) \ \overline{w}_p(1)] = \begin{cases} [+1 \ +1], & p \in a \\ [-1 \ +1], & p \in b \end{cases},$$

wherein n is the first parameter of the reference signal, r(x) is a reference signal sequence, $N_{RB}^{max,DL}$ is a maximum system bandwidth, $n_s$ is a slot number, and mod indicates a modulo operation.

10. The base station according to claim 7, wherein the first parameter n of the reference signal comprises one of values as follows:
n=n', n'+1, . . . , n'+$N_{BCH}$−1, wherein n' is any predefined integer, and $N_{BCH}$ is the number of resource blocks occupied by the broadcast channel; or
n=n', n'+1, . . . , n'+$N_{BCH}$−1, wherein n'=cell_id mod ($N_{RB}^{max,DL}$+1−$N_{BCH}$), or n'=cell_id mod ($N_{RB}^{max,DL}$ −$N_{BCH}$), or n'=cell_id modM, $N_{RB}^{max,DL}$ is a maximum system bandwidth, M is an integer no larger than the maximum system bandwidth $N_{RB}^{max,DL}$, cell-id is a cell identity, mod indicates a modulo operation, and $N_{BCH}$ is the number of resource blocks occupied by the broadcast channel.

11. A user equipment, comprising a processor and a non-transitory processor-readable medium having processor-executable instructions stored thereon, the processor-executable instructions comprising a plurality of units, the units comprising:
a port determination unit, configured to determine an antenna port of a reference signal corresponding to a broadcast channel;
a receiving unit, configured to receive a complex-valued modulation symbol of the reference signal transmitted by a base station at the antenna port of the reference signal determined by the port determination unit;
the units further comprising:
a symbol determination unit, configured to determine a complex-valued modulation signal of the reference signal according to a first parameter of the reference signal, wherein the first parameter of the reference signal is determined according to the number of resource blocks occupied by the broadcast channel,
a subcarrier determination unit, configured to determine a subcarrier of the complex-valued modulation symbol of the reference signal according to the first parameter of the reference signal, and
the receiving unit is configured to: receive the complex-valued modulation symbol of the reference signal transmitted by the base station at the antenna port of the reference signal determined by the port determination unit and on the subcarrier determined by the subcarrier determination unit,
wherein the antenna port of the reference signal corresponding to the broadcast channel determined by the port determination unit comprises: two or four antenna ports among antenna ports a, b, c and d, wherein a, b, c and d are any positive integers; and
the subcarrier determination unit is configured to:
in a case of a normal cyclic prefix (CP), determine the subcarrier of the complex-valued modulation symbol of the reference signal according to formula (1) as follows,
the formula (1) is:

$$k = 5m' + N_{sc}^{RB} n + k' + \frac{N_{RB}^{DL} N_{sc}^{RB}}{2} - 36$$

-continued wherein $m' = 0, 1, 2$ $$k' = \begin{cases} 1 & p \in \{a, b\} \\ 0 & p \in \{c, d\} \end{cases},$$

wherein k is a subcarrier index, n is the first parameter of the reference signal, $N_{sc}^{RB}$ is the number of subcarriers of a resource block, and $N_{RB}^{DL}$ is a system bandwidth; or, in a case of an extended CP, determine the subcarrier of the complex-valued modulation symbol of the reference signal according to formula (2) as follows, the formula (2) is:

$$k = 3m' + N_{sc}^{RB} n + k' + \frac{N_{RB}^{DL} N_{sc}^{RB}}{2} - 36$$

wherein $m' = 0, 1, 2, 3$ $$k' = \begin{cases} 1 & \text{if } n_s \bmod 2 = 0 \text{ and } p \in \{a, b\} \\ 2 & \text{if } n_s \bmod 2 = 1 \text{ and } p \in \{c, d\} \end{cases},$$

wherein k is a subcarrier index, n is the first parameter of the reference signal, $N_{sc}^{RB}$ is the number of subcarriers of a resource block, $N_{RB}^{DL}$ is a system bandwidth, and mod indicates a modulo operation.

12. The user equipment according to claim 11, wherein the antenna port of the reference signal corresponding to the broadcast channel comprises:
antenna ports located where resource elements of any two or four of antenna ports 7-14 are located; or
antenna ports shifting by at least one orthogonal frequency-division multiplexing (OFDM) symbol or by at least one subcarrier from locations of resource elements of any two or four of antenna ports 7-14.

13. The user equipment according to claim 11, wherein the symbol determination unit is configured to:
in a case of a normal cyclic prefix (CP), determine the complex-valued modulation symbol $a_{k,l}^{(p)}$ of the reference signal of the broadcast channel according to formula (3) as follows, wherein p is the antenna port, k is a subcarrier index, and l is an OFDM symbol index, the formula (3) is:

$$a_{k,l}^{(p)} = w_p(l') \cdot r(3 \cdot l' \cdot N_{RB}^{max,DL} + 3n + m')$$

wherein $$w_p(i) = \begin{cases} \overline{w}_p(i) & (m'+n) \bmod 2 = 0 \\ \overline{w}_p(3-i) & (m'+n) \bmod 2 = 1 \end{cases}$$

$l = l' \bmod 2 + 5$ $$l' = \begin{cases} 0, 1 & \text{if } n_s \bmod 2 = 0 \\ 2, 3 & \text{if } n_s \bmod 2 = 1 \end{cases}$$

$m' = 0, 1, 2,$ a value of $\overline{w}_p(i)$ is:

$$[\overline{w}_p(0) \; \overline{w}_p(1) \; \overline{w}_p(2) \; \overline{w}_p(3)] = \begin{cases} [+1 \; +1 \; -1 \; -1], & p \in a \\ [-1 \; -1 \; +1 \; +1], & p \in b \\ [+1 \; -1 \; -1 \; +1], & p \in c \\ [-1 \; +1 \; +1 \; -1], & p \in d \end{cases},$$

wherein n is the first parameter of the reference signal, r(x) is a reference signal sequence, $N_{RB}^{max,DL}$ is a maximum system bandwidth, $n_s$ is a slot number, and mod indicates a modulo operation;

or, in a case of an extended CP, determine the complex-valued modulation symbol $a_{k,l}^{(p)}$ of the reference signal of the broadcast channel according to formula (4) as follows, the formula (4) is:

$$a_{k,l}^{(p)} = w_p(l' \bmod 2) \cdot r(4 \cdot l' \cdot N_{RB}^{max,DL} + 4 \cdot n + m'),$$

wherein $$w_p(i) = \begin{cases} \overline{w}_p(i) & m' \bmod 2 = 0 \\ \overline{w}_p(1-i) & m' \bmod 2 = 1 \end{cases}$$

$l = l' \bmod 2 + 4$ $$l' = \begin{cases} 0, 1 & \text{if } n_s \bmod 2 = 0 \\ 2, 3 & \text{if } n_s \bmod 2 = 1 \end{cases}$$

$m' = 0, 1, 2, 3$ a value of $\overline{w}_p(i)$ is:

$$[\overline{w}_p(0) \; \overline{w}_p(1)] = \begin{cases} [+1 \; +1], & p \in a \\ [-1 \; +1], & p \in b \end{cases},$$

wherein n is the first parameter of the reference signal, r(x) is a reference signal sequence, $N_{RB}^{max,DL}$ is a maximum system bandwidth, $n_s$ is a slot number, and mod indicates a modulo operation.

14. The user equipment according to claim 11, wherein the first parameter n of the reference signal comprises one of values as follows:

n=n', n'+1, . . . , n'+$N_{BCH}$−1, wherein n' is any predefined integer, and $N_{BCH}$ is the number of resource blocks occupied by the broadcast channel; or n=n', n'+1, . . . , n'+$N_{BCH}$−1, wherein n'=cell_id mod ($N_{RB}^{max,DL}$+1−$N_{BCH}$), or n'=cell_id mod($N_{RB}^{max,DL}$−$N_{BCH}$), or n'=cell_id modM, $N_{RB}^{max,DL}$ is a maximum system bandwidth, M is an integer no larger than the maximum system bandwidth $N_{RB}^{max,DL}$, cell-id is a cell identity, mod indicates a modulo operation, and $N_{BCH}$ is the number of resource blocks occupied by the broadcast channel.

* * * * *